US012659675B2

(12) United States Patent
Jensen et al.

(10) Patent No.: US 12,659,675 B2
(45) Date of Patent: Jun. 16, 2026

(54) USE OF HEARING INSTRUMENT TELECOILS TO DETERMINE CONTEXTUAL INFORMATION, ACTIVITIES, OR MODIFIED MICROPHONE SIGNALS

(71) Applicant: Starkey Laboratories, Inc., Eden Prairie, MN (US)

(72) Inventors: Kenneth Jensen, Brunswick, MD (US); Justin Burwinkel, Eden Prairie, MN (US); Thomas Olai Monsen, Chaska, MN (US); Eric George, Bloomington, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 337 days.

(21) Appl. No.: 18/316,563

(22) Filed: May 12, 2023

(65) Prior Publication Data

US 2023/0370792 A1     Nov. 16, 2023

Related U.S. Application Data

(60) Provisional application No. 63/364,779, filed on May 16, 2022.

(51) Int. Cl.
*H04R 25/00* (2006.01)
*G06N 20/00* (2019.01)

(52) U.S. Cl.
CPC .......... *H04R 25/507* (2013.01); *G06N 20/00* (2019.01); *H04R 25/554* (2013.01); *H04R 2225/43* (2013.01); *H04R 2225/55* (2013.01)

(58) Field of Classification Search
CPC .... G06N 20/00; H04R 25/507; H04R 25/554; H04R 2225/43; H04R 2225/55; H04R 1/1041; H04R 25/43
See application file for complete search history.

(56) References Cited

U.S. PATENT DOCUMENTS

| | | | | |
|---|---|---|---|---|
| 9,025,803 B2 * | 5/2015 | Sacha | ................. | H04R 25/554 |
| | | | | 381/330 |
| 9,392,379 B2 | 7/2016 | Salvetti et al. | | |
| 2021/0290102 A1 | 9/2021 | Burwinkel et al. | | |

FOREIGN PATENT DOCUMENTS

| | | |
|---|---|---|
| WO | 2014137913 A1 | 9/2014 |
| WO | 2020124022 A2 | 6/2020 |
| WO | 2021154822 A1 | 5/2021 |
| WO | 2022010156 A1 | 1/2022 |

OTHER PUBLICATIONS

Response to Extended Search Report dated Nov. 27, 2023, from counterpart European Application No. 23173671.1 filed May 22, 2024, 10 pp.

(Continued)

*Primary Examiner* — Brian Ensey
(74) *Attorney, Agent, or Firm* — Shumaker & Sieffert, P.A.

(57) ABSTRACT
This disclosure describes a method comprising: obtaining, by a processing system that includes one or more processors implemented in circuitry, a signal from a magnetic sensor of a hearing instrument; determining, by the processing system, a context of the hearing instrument based at least in part on the signal from the telecoil; and initiating, by the processing system, one or more actions based on the context of the hearing instrument.

24 Claims, 9 Drawing Sheets

(56)                    References Cited

OTHER PUBLICATIONS

Extended Search Report from counterpart European Application No. 23173671.1 dated Oct. 2, 2023, 9 pp.
"Sources of EMF", Retrieved from: https://www.emf-portal.org/en/emf-source/frequency-search?startMantissa=0&startExponent=0&endMantissa=30000&endExponent=0, Accessed on: Aug. 9, 2023, 7 pp.
Response to Communication pursuant to Article 94(3) EPC dated Sep. 9, 2025, from counterpart European Application No. 23173671.1 filed Jan. 8, 2026, 13 pp.
Communication pursuant to Article 94(3) EPC from counterpart European Application No. 23173671.1 dated Sep. 9, 2025, 4 pp.

* cited by examiner

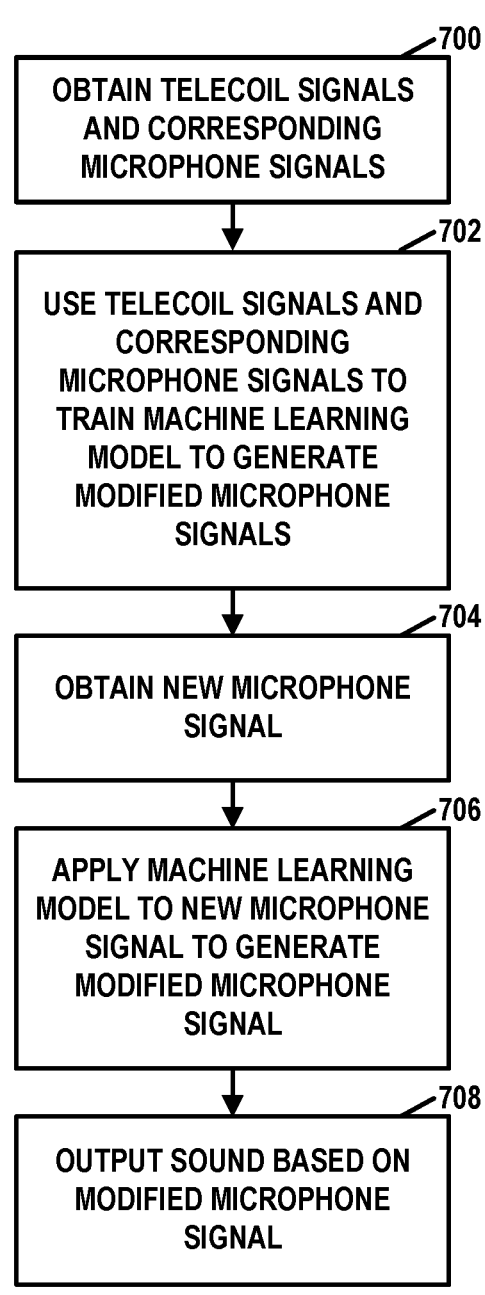

OBTAIN TELECOIL SIGNALS
AND CORRESPONDING
MICROPHONE SIGNALS
_700

USE TELECOIL SIGNALS AND
CORRESPONDING
MICROPHONE SIGNALS TO
TRAIN MACHINE LEARNING
MODEL TO GENERATE
MODIFIED MICROPHONE
SIGNALS
_702

OBTAIN NEW MICROPHONE
SIGNAL
_704

APPLY MACHINE LEARNING
MODEL TO NEW MICROPHONE
SIGNAL TO GENERATE
MODIFIED MICROPHONE
SIGNAL
_706

OUTPUT SOUND BASED ON
MODIFIED MICROPHONE
SIGNAL
_708

FIG. 7

USE OF HEARING INSTRUMENT TELECOILS TO DETERMINE CONTEXTUAL INFORMATION, ACTIVITIES, OR MODIFIED MICROPHONE SIGNALS

This application claims the benefit of U.S. provisional patent application 63/364,779, filed May 16, 2022, the entire content of which is incorporated by reference.

TECHNICAL FIELD

This disclosure relates to hearing instruments.

BACKGROUND

Hearing instruments are devices designed to be worn on, in, or near one or more of a user's ears. Common types of hearing instruments include hearing assistance devices (e.g., "hearing aids"), earphones, headphones, hearables, and so on. Some hearing instruments include features in addition to or in the alternative to environmental sound amplification. For example, some modern hearing instruments include advanced audio processing for improved device functionality, controlling and programming the devices, and beamforming, and some can communicate wirelessly with external devices including other hearing instruments (e.g., for streaming media).

SUMMARY

This disclosure describes techniques, circuits, and systems that use information from telecoils of hearing instruments to determine contextual information, determine user activities, generate modified microphone signals, or generate other types of information.

In one example, this disclosure describes a method comprising: obtaining, by a processing system that includes one or more processors implemented in circuitry, a signal from a telecoil of a hearing instrument; determining, by the processing system, a context of the hearing instrument based at least in part on the signal from the telecoil; and initiating, by the processing system, one or more actions based on the context of the hearing instrument.

In another example, this disclosure describes a method comprising: obtaining, by a processing system that includes one or more processors implemented in circuitry, a signal from a telecoil of a hearing instrument; determining, by the processing system, an activity of a user of the hearing instrument based at least in part on the signal from the telecoil; and initiating, by the processing system, one or more actions based on the activity of the user of the hearing instrument.

In another example, this disclosure describes a method comprising: obtaining telecoil signals and corresponding microphone signals; using the telecoil signals and corresponding microphone signals to train a machine learning model to generate modified microphone signals that resemble the telecoil signals; obtaining a new microphone signal; applying the machine learning model to the new microphone signal to generate a new modified microphone signal; and outputting sound based on the new modified microphone signal.

In another example, this disclosure describes a system comprising: one or more storage devices configured to store signals from a telecoil of a hearing instrument; and a processing system comprising one or more processors configured to: determine a context of the hearing instrument based at least in part on the signal from the telecoil; and initiate one or more actions based on the context of the hearing instrument.

In another example, this disclosure describes a system comprising: one or more storage devices configured to store signals from a telecoil of a hearing instrument; and a processing system comprising one or more processors configured to: determine an activity of a user of the hearing instrument based at least in part on the signal from the telecoil; and initiate one or more actions based on the activity of the hearing instrument.

In another example, this disclosure describes a system comprising: one or more storage devices configured to store telecoil signals and corresponding microphone signals; and a processing system comprising one or more processors configured to: use the telecoil signals and corresponding microphone signals to train a machine learning model to generate modified microphone signals that resemble the telecoil signals; obtain a new microphone signal; apply the machine learning model to the new microphone signal to generate a new modified microphone signal; and output sound based on the new modified microphone signal.

The details of one or more aspects of the disclosure are set forth in the accompanying drawings and the description below. Other features, objects, and advantages of the techniques described in this disclosure will be apparent from the description, drawings, and claims.

BRIEF DESCRIPTION OF DRAWINGS

FIG. 7 is a flowchart illustrating an example operation in accordance with one or more techniques of this disclosure.

DETAILED DESCRIPTION

Figure 1:
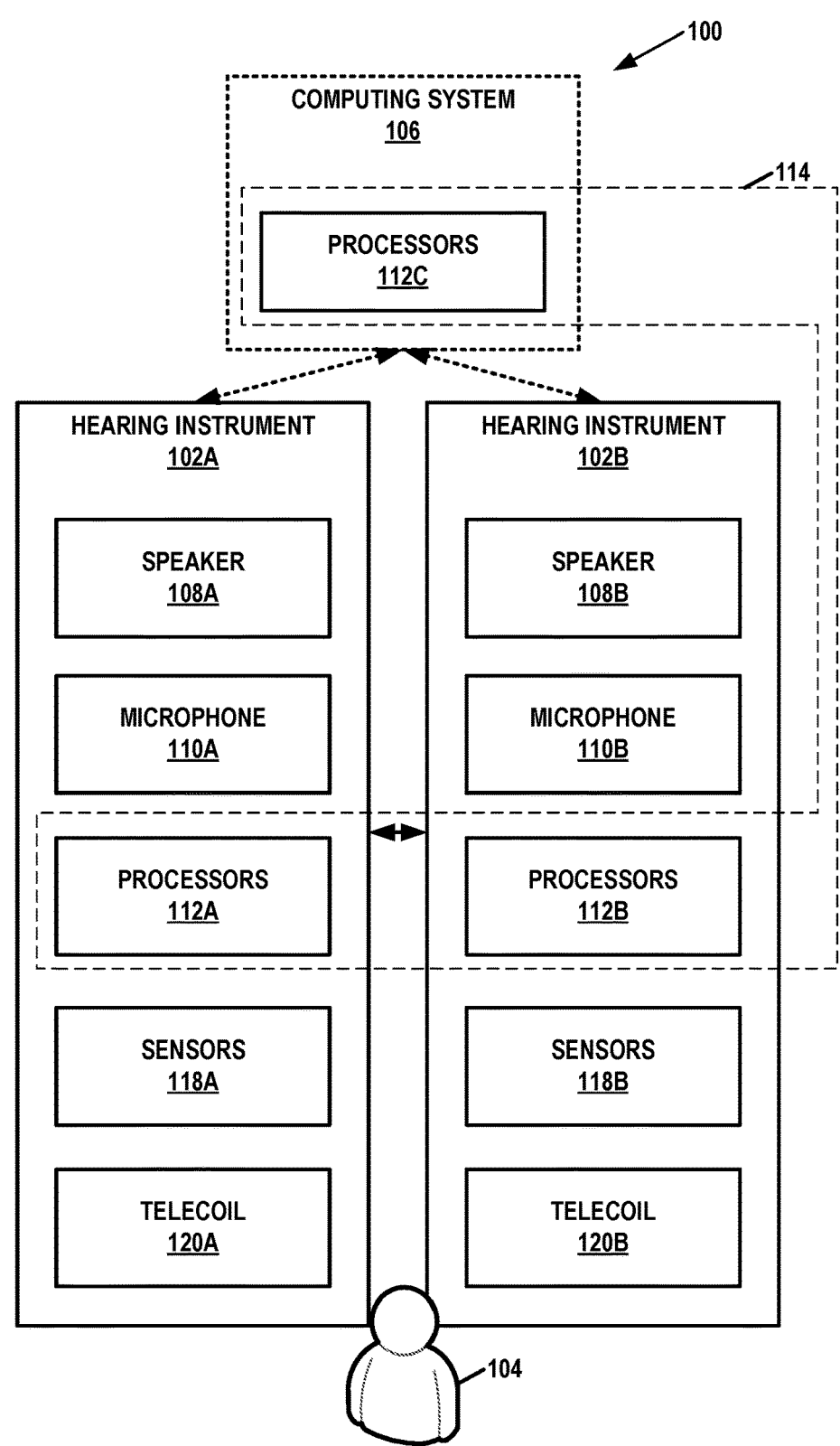
FIG. 1 is a conceptual diagram illustrating an example system that includes one or more hearing instruments, in accordance with one or more techniques of this disclosure.

FIG. 1 is a conceptual diagram illustrating an example system 100 that includes hearing instruments 102A, 102B, in accordance with one or more techniques of this disclosure. This disclosure may refer to hearing instruments 102A and 102B collectively, as "hearing instruments 102." A user 104 may wear hearing instruments 102. In some instances, user 104 may wear a single hearing instrument. In other instances, the user may wear two hearing instruments, with one hearing instrument for each ear of user 104.

Hearing instruments 102 may comprise one or more of various types of devices that are configured to provide auditory stimuli to user 104 and that are designed for wear and/or implantation at, on, near, or in relation to the physiological function of an ear of user 104. Hearing instruments 102 may be worn, at least partially, in the ear canal or concha. In any of the examples of this disclosure, each of hearing instruments 102 may comprise a hearing assistance device. Hearing assistance devices may include devices that help a user hear sounds in the user's environment. Example types of hearing assistance devices may include hearing aid devices, Personal Sound Amplification Products (PSAPs), and so on. In some examples, hearing instruments 102 are over-the-counter, direct-to-consumer, or prescription devices. Furthermore, in some examples, hearing instruments 102 include devices that provide auditory stimuli to user 104 that correspond to artificial sounds or sounds that are not naturally in the user's environment, such as recorded music, computer-generated sounds, sounds from a microphone remote from the user, or other types of sounds. For instance, hearing instruments 102 may include so-called "hearables," earbuds, earphones, or other types of devices. Some types of hearing instruments provide auditory stimuli to user 104 corresponding to sounds from the user's environment and also artificial sounds. In some examples, hearing instruments 102 may include cochlear implants or brainstem implants. In some examples, hearing instruments 102 may use a bone conduction pathway to provide auditory stimulation.

In some examples, one or more of hearing instruments 102 includes a housing or shell that is designed to be worn in the ear for both aesthetic and functional reasons and encloses the electronic components of the hearing instrument. Such hearing instruments may be referred to as in-the-ear (ITE), in-the-canal (ITC), completely-in-the-canal (CIC), or invisible-in-the-canal (IIC) devices. In some examples, one or more of hearing instruments 102 may be behind-the-ear (BTE) devices, which include a housing worn behind the ear that contains electronic components of the hearing instrument, including the receiver (e.g., a speaker). The receiver conducts sound to an earbud inside the ear via an audio tube. In some examples, one or more of hearing instruments 102 may be receiver-in-canal (RIC) hearing-assistance devices, which include a housing worn behind the ear that contains electronic components and a housing worn in the ear canal that contains the receiver.

Hearing instruments 102 may implement a variety of features that help user 104 hear better. For example, hearing instruments 102 may amplify the intensity of incoming sound, amplify the intensity of incoming sound at certain frequencies, translate or compress frequencies of the incoming sound, receive wireless audio transmissions from hearing assistive listening systems and hearing aid accessories (e.g., remote microphones, media streaming devices, and the like), and/or perform other functions to improve the hearing of user 104. In some examples, hearing instruments 102 may implement a directional processing mode in which hearing instruments 102 selectively amplify sound originating from a particular direction (e.g., to the front of user 104) while potentially fully or partially canceling sound originating from other directions. In other words, a directional processing mode may selectively attenuate off-axis unwanted sounds. The directional processing mode may help users understand conversations occurring in crowds or other noisy environments. In some examples, hearing instruments 102 may use beamforming or directional processing cues to implement or augment directional processing modes.

In some examples, hearing instruments 102 may reduce noise by canceling out or attenuating certain frequencies. Furthermore, in some examples, hearing instruments 102 may help user 104 enjoy audio media, such as music or sound components of visual media, by outputting sound based on audio data wirelessly transmitted to hearing instruments 102.

Hearing instruments 102 may be configured to communicate with each other. For instance, in any of the examples of this disclosure, hearing instruments 102 may communicate with each other using one or more wireless communication technologies. Example types of wireless communication technology include Near-Field Magnetic Induction (NFMI) technology, 900 MHz technology, a BLUETOOTH™ technology, WI-FI™ technology, audible sound signals, ultrasonic communication technology, infrared communication technology, inductive communication technology, or another type of communication that does not rely on wires to transmit signals between devices. In some examples, hearing instruments 102 use a 2.4 GHz frequency band for wireless communication. In examples of this disclosure, hearing instruments 102 may communicate with each other via non-wireless communication links, such as via one or more cables, direct electrical contacts, and so on.

As shown in the example of FIG. 1, system 100 may also include a computing system 106. In other examples, system 100 does not include computing system 106. Computing system 106 comprises one or more computing devices, each of which may include one or more processors. For instance, computing system 106 may comprise one or more mobile devices, server devices, personal computer devices, handheld devices, wireless access points, smart speaker devices, smart televisions, medical alarm devices, smart key fobs, smartwatches, smartphones, motion or presence sensor devices, smart displays, screen-enhanced smart speakers, wireless routers, wireless communication hubs, prosthetic devices, mobility devices, special-purpose devices, accessory devices, and/or other types of devices.

Accessory devices may include devices that are configured specifically for use with hearing instruments 102. Example types of accessory devices may include charging cases for hearing instruments 102, storage cases for hearing instruments 102, media streamer devices, phone streamer devices, external microphone devices, external telecoil devices, remote controls for hearing instruments 102, and other types of devices specifically designed for use with hearing instruments 102. Actions described in this disclosure as being performed by computing system 106 may be performed by one or more of the computing devices of computing system 106. One or more of hearing instruments 102 may communicate with computing system 106 using wireless or non-wireless communication links. For instance, hearing instruments 102 may communicate with computing system 106 using any of the example types of communication technologies described elsewhere in this disclosure.

Furthermore, in the example of FIG. 1, hearing instrument 102A includes a speaker 108A, a microphone 110A, a set of one or more processors 112A, sensors 118A, and a telecoil 120A. Hearing instrument 102B includes a speaker 108B, a microphone 110B, a set of one or more processors 112B, sensors 118B, and a telecoil 120B. This disclosure may refer to speaker 108A and speaker 108B collectively as "speakers 108." This disclosure may refer to microphone 110A and microphone 110B collectively as "microphones 110." This disclosure may refer to telecoil 120A and telecoil 120B collectively as "telecoils 120." Although this disclosure discusses telecoils, such discussion may apply with respect to other types of magnetic sensors. Computing system 106 includes a set of one or more processors 112C. Processors 112C may be distributed among one or more devices of computing system 106. This disclosure may refer to processors 112A, 112B, and 112C collectively as "processors 112." Processors 112 may be implemented in circuitry and may comprise microprocessors, application-specific integrated circuits, digital signal processors, artificial intelligence (AI) accelerators, or other types of circuits.

As noted above, hearing instruments 102A, 102B, and computing system 106 may be configured to communicate with one another. Accordingly, processors 112 may be configured to operate together as a processing system 114. Thus, discussion in this disclosure of actions performed by processing system 114 may be performed by one or more processors in one or more of hearing instrument 102A, hearing instrument 102B, or computing system 106, either separately or in coordination.

Hearing instruments 102 and computing system 106 may include components in addition to those shown in the example of FIG. 1. For instance, each of hearing instruments 102 may include one or more additional microphones configured to detect sound in an environment of user 104. The additional microphones may include omnidirectional microphones, directional microphones, own-voice detection sensors, or other types of microphones.

Speakers 108 may be located on hearing instruments 102 so that sound generated by speakers 108 is directed medially through respective ear canals of user 104. For instance, speakers 108 may be located at medial tips of hearing instruments 102. The medial tips of hearing instruments 102 are designed to be the most medial parts of hearing instruments 102. Microphones 110 may be located on hearing instruments 102 so that microphones 110 may detect sound within the ear canals of user 104.

Hearing instrument 102A may include sensors 118A, and similarly, hearing instrument 102B may include sensors 118B. This disclosure may refer to sensors 118A and sensors 118B collectively as sensors 118. For each of hearing instruments 102, one or more of sensors 118 may be included in in-ear assemblies of hearing instruments 102. In some examples, one or more of sensors 118 are included in behind-the-ear assemblies of hearing instruments 102 or in cables connecting in-ear assemblies and behind-the-ear assemblies of hearing instruments 102. Although not illustrated in the example of FIG. 1, in some examples, one or more devices other than hearing instruments 102 may include one or more of sensors 118. For instance, a mobile phone of computing system 106 may include one or more of sensors 118.

Telecoils 120 are configured to detect changes in magnetic fields. Telecoils 120 may be active or passive. Each of telecoils 120 may include a metallic core around which a wire is coiled. When telecoils 120 are in a magnetic field, currents are induced in the wires, such as alternating currents induced in the presence of an alternating magnetic field. Typically, telecoils 120 are used to receive audio information from audio sources, such as telephones, inductive hearing loops, hearing assistive listening systems using neck loops, and so on. For instance, telecoils 120 may allow hearing instruments 102 (e.g., hearing aids, cochlear implants, etc.) to wirelessly pick up direct audio input from the magnetic fields produced by telephone receivers and hearing assistive listening systems using induction hearing loops or body-wearable loops, such as neck loops.

In some examples, an in-ear assembly of hearing instrument 102A includes all components of hearing instrument 102A. Similarly, in some examples, an in-ear assembly includes all components of hearing instrument 102B. In other examples, components of hearing instrument 102A may be distributed between an in-ear assembly and another assembly of hearing instrument 102A. For instance, in examples where hearing instrument 102A is a RIC device, an in-ear assembly may include speaker 108A and microphone 110A and an in-ear assembly may be connected to a behind-the-ear assembly of hearing instrument 102A via a cable. Similarly, in some examples, components of hearing instrument 102B may be distributed between in-ear assembly and another assembly of hearing instrument 102B. In examples where hearing instrument 102A is an ITE, ITC, CIC, or IIC device, the in-ear assembly may include all primary components of hearing instrument 102A. In examples where hearing instrument 102B is an ITE, ITC, CIC, or IIC device, the in-ear assembly may include all primary components of hearing instrument 102B. In some examples, hearing instruments 102 may be contralateral routing of signal (CROS) hearing instruments in which a microphone signal from one hearing instrument is transmitted to the opposite hearing instrument. In some examples of CROS hearing instruments, there may not be a speaker in the transmitter device. In some examples, hearing instruments 102 may be bilateral CROS (BiCROS) hearing instruments in a first hearing instrument associated with an ear have poorer hearing transmits microphone signals to a second, opposite hearing instrument associated with the ear having better hearing, and the second hearing instrument amplifies microphone signals of microphones of the second hearing instrument.

Hearing instruments 102 may include a wide variety of configurable output settings. For example, the output settings of hearing instruments 102 may include audiological output settings that address hearing loss. Such audiological output settings may include gain levels for individual frequency bands, settings to control frequency compression, settings to control frequency translation, and so on. Other output settings of hearing instruments 102 may apply various noise reduction filters to incoming sound signals, apply directional processing modes, and so on.

Hearing instruments 102 may use different output settings in different contexts. For example, hearing instruments 102 may use a first set of output settings for contexts in which hearing instruments 102 are in a crowded restaurant and another set of output settings for situations in which hearing instruments 102 are in a quiet location, and so on. Hearing instruments 102 may be configured to automatically change between sets of output settings, e.g., based on the context.

Determining the context of hearing instruments 102 may therefore be important to selecting appropriate output settings. Hearing instruments 102 (e.g., hearing aids) have traditionally relied on acoustic environment classification to inform audio processing adaptations. In recent years, machine learning and inputs from sensors in addition to microphones have been used to improve the accuracy of acoustic environment classification and to provide additional context, such as determining the user's activity. Contextual information may be particularly useful for inferring listener intent, selecting the most appropriate listening modes, and applying suitable noise reduction techniques.

Beyond the traditional applications of telecoils, telecoils 120 are inherently sensitive to the presence of other electromagnetic fields, including those produced by electronic devices encountered in more common, everyday listening environments. These electronic devices may include appliances found in the home or electromagnetic fields inherent to various forms of transportation, like cars or light rail systems. In some examples, non-electronic devices (e.g., manual toothbrushes, combs, toilets, showers, tubs, lawnmowers, electric fences, etc.) may be equipped with magnets or beacon-emitting devices that may induce currents in telecoils. As such, processing system 114 may use electromagnetic information in the environment detected by telecoils 120 or other types of magnetic sensors to make contextual changes to parameters of hearing instruments 102, beyond merely receiving acoustic information. For example, internal-combustion engines radiate electromagnetic fields that can be detected by telecoils 120, which may indicate to hearing instruments 102 to adjust specific noise reduction parameters. The additional data inputs derived from telecoils 120 may result in overall more robust environment classification and hearing aid adaptation approaches.

As described herein, processing system 114 may determine, based on information from one or more of telecoils 120 of hearing instruments 102, currently existing values of a plurality of context parameters. Each context in a plurality of contexts may correspond to a different unique combination of potential values of the plurality of context parameters.

In some examples, the plurality of context parameters may include one or more context parameters that are not determined based on signals from sensors 118 or telecoils. For example, the plurality of context parameters may include one or more context parameters having values that may be set based on user input. For instance, the plurality of context parameters may include user age, gender, lifestyle (e.g., sedentary or active, habits of the user, activities the user tends to engage in, etc.), or other factors associated with the patient or use environment.

In addition to or as an alternative to providing contextual information for acoustic environment classification, information collected from telecoils 120 may also be used in so-called "healthable" hearing instrument applications. For example, a consideration for older adults to live independently is the ability to perform activities of daily living (ADLs). For various reasons, it can be valuable for caregivers to have means to verify the completion of an older adult's ADLs, including their functional mobility, personal hygiene, toileting, and self-feeding. Incidentally, many ADLs involve use of electronic devices which emit electromagnetic fields that can be detected using the telecoil of an ear-worn device, such as kitchen appliances and electric toothbrushes. Hence, in accordance with one or more techniques of this disclosure, processing system 114 (e.g., one or more of processors 112A, 112B, and/or 112C) may use machine learning and hearing instruments 102 with embedded telecoils 120 to provide acoustic environment context and monitor users' performance of ADLs.

In some examples, processing system 114 may receive signals from telecoils or other magnetic sensors in devices other than hearing instruments 102 in addition to or as an alternative to receiving signals from telecoils or magnetic sensors of hearing instruments 102. For instance, processing system 114 may receive signals from magnetic sensors of a wearable device, smartphone, or other type of device. Processing system 114 may use such signals in any of the examples of this disclosure.

Figure 2:
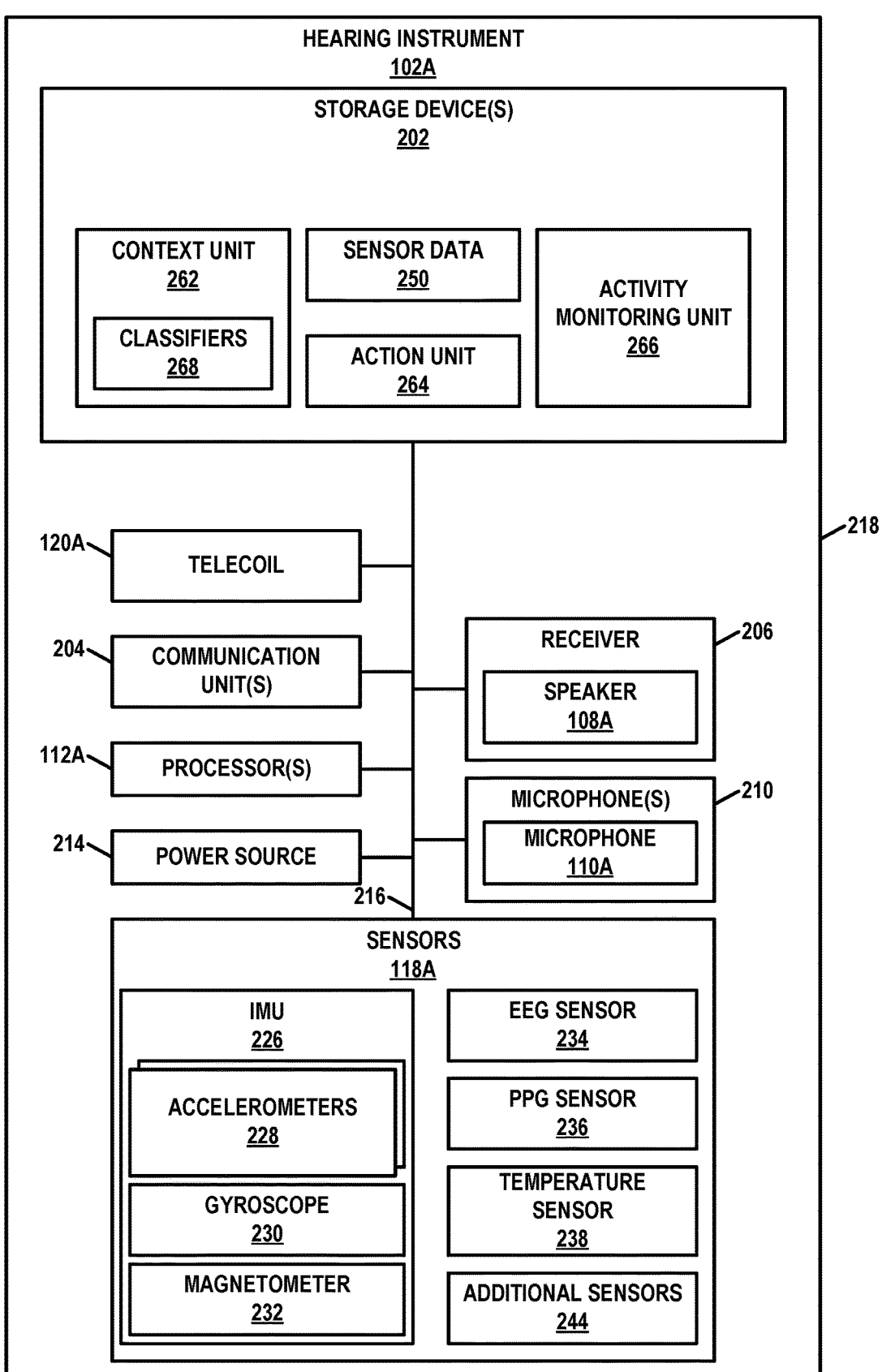
FIG. 2 is a block diagram illustrating example components of a hearing instrument, in accordance with one or more techniques of this disclosure.

FIG. 2 is a block diagram illustrating example components of hearing instrument 102A, in accordance with one or more techniques of this disclosure. Hearing instrument 102B may include the same or similar components of hearing instrument 102A shown in the example of FIG. 2. In the example of FIG. 2, hearing instrument 102A comprises one or more storage devices 202, one or more communication units 204, a receiver 206, one or more processors 112A, one or more microphones 210, sensors 118A, telecoil 120A, a power source 214, and one or more communication channels 216. Communication channels 216 provide communication between storage devices 202, communication unit(s) 204, receiver 206, processor(s) 112A, microphone(s) 210, sensors 118A, and telecoil 120A. Storage devices 202, communication unit(s) 204, receiver 206, processors 112A, microphone(s) 210, sensors 118A, and telecoil 120A may draw electrical power from power source 214.

In the example of FIG. 2, each of storage devices 202, communication unit(s) 204, receiver 206, processors 112A, microphone(s) 210, sensors 118A, telecoil 120A, power source 214, and communication channels 216 are contained within a single housing 218. Thus, in such examples, each of storage devices 202, communication unit(s) 204, receiver 206, processors 112A, microphone(s) 210, sensors 118A, telecoil 120A, power source 214, and communication channels 216 may be within an in-ear assembly of hearing instrument 102A. However, in other examples of this disclosure, storage devices 202, communication unit(s) 204, receiver 206, processors 112A, microphone(s) 210, sensors 118A, telecoil 120A, power source 214, and communication channels 216 may be distributed among two or more housings. For instance, in an example where hearing instrument 102A is a RIC device, receiver 206, one or more of microphone(s) 210, and one or more of sensors 118A may be included in an in-ear housing separate from a behind-the-ear housing that contains the remaining components of hearing instrument 102A. In such examples, a MC cable may connect the two housings.

In the example of FIG. 2, sensors 118A include an inertial measurement unit (IMU) 226 that is configured to generate data regarding the motion of hearing instrument 102A. IMU 226 may include a set of sensors. For instance, in the example of FIG. 2, IMU 226 includes one or more accelerometers 228, a gyroscope 230, a magnetometer 232, combinations thereof, and/or other sensors for determining the motion, altitude, or location of hearing instrument 102A. Furthermore, in the example of FIG. 2, sensors 118A may include an electroencephalography (EEG) sensor 234, a photoplethysmography (PPG) sensor 236, and a temperature sensor 238. In some examples, sensors 118A may include additional sensors 244. Additional sensors 244 may include capacitance sensors, blood oximetry sensors, blood pressure sensors, environmental pressure sensors, environmental humidity sensors, skin galvanic response sensors, light sensors, magnetic sensors, vibration sensors, optical sensors, and/or other types of sensors. In some examples, additional sensors 244 may include ocular sensors that capture eye information, such as eye movement, pupil state, eye muscle activity, eyelid movements or positions, and so on. The ocular sensors may include one or more cameras pointed at the eyes of user 104, electrodes, mechanical sensors, sound sensors, and so on. One or more of sensors 118A may capture physiological information, such as heart rate, blood oxygen saturation (SPO2), respiratory rate, and other information understand the physical state of user 104.

Storage device(s) 202 may store data. Storage device(s) 202 may comprise volatile memory and may therefore not retain stored contents if powered off. Examples of volatile memories may include random access memories (RAM), dynamic random access memories (DRAM), static random access memories (SRAM), and other forms of volatile memories known in the art. Storage device(s) 202 may further be configured for long-term storage of information as non-volatile memory space and retain information after power on/off cycles. Examples of non-volatile memory configurations may include flash memories, or forms of electrically programmable memories (EPROM) or electrically erasable and programmable (EEPROM) memories.

Communication unit(s) 204 may enable hearing instrument 102A to send data to and receive data from one or more other devices, such as a device of computing system 106 (FIG. 1), another hearing instrument (e.g., hearing instrument 102B), an accessory device, a mobile device, or another type of device. Communication unit(s) 204 may enable hearing instrument 102A to use wireless or non-wireless communication technologies. For instance, communication unit(s) 204 enable hearing instrument 102A to communicate using one or more of various types of wireless technology, such as a BLUETOOTH™ technology, 3G, 4G, 4G LTE, 5G, 6G, ZigBee, WI-FI™, Near-Field Magnetic Induction (NFMI), FM, 900 MHz, ultrasonic communication, infrared (IR) communication, or another wireless communication technology. In some examples, communication unit(s) 204 may enable hearing instrument 102A to communicate using a cable-based technology, such as a Universal Serial Bus (USB) technology.

Receiver 206 may comprise one or more speakers, such as speaker 108A, for generating audible sound. Microphone(s) 210 detect incoming sound and generate one or more electrical signals (e.g., an analog or digital electrical signal) representing the incoming sound.

Processor(s) 112A may comprise processing circuits configured to perform various activities. For example, processor(s) 112A may process signals generated by microphone(s) 210 to enhance, amplify, or cancel-out particular channels within the incoming sound. Processor(s) 112A may then cause receiver 206 to generate sound based on the processed signals. In some examples, processor(s) 112A include one or more digital signal processors (DSPs). In some examples, processor(s) 112A may cause communication unit(s) 204 to transmit one or more of various types of data. For example, processor(s) 112A may cause communication unit(s) 204 to transmit data to computing system 106. Furthermore, communication unit(s) 204 may receive audio data from computing system 106 and processor(s) 112A may cause receiver 206 to output sound based on the audio data. In some examples, processor(s) 112A include machine learning (e.g., neural network) acceleration circuitry.

In the example of FIG. 2, receiver 206 includes speaker 108A. Speaker 108A may generate a sound that includes a range of frequencies. Speaker 108A may refer to a single speaker or may refer to one or more of a plurality of speakers in receiver 206. For instance, receiver 206 may also include so-called "woofers," "tweeters," that provide additional frequency range, and in some cases, additional "mid-range speakers" can be included for frequencies between those of woofers and tweeters. In some examples, speaker 108A may be implemented as a plurality of speakers. In some examples, hearing instrument 102A may include mechanical/automated venting controls that regulate the amount of sound leakage or ambient noise passing through the hearing device. Vent status may be an additional hearing instrument setting that may be controlled based on a context of hearing instrument 102A.

Furthermore, in the example of FIG. 2, microphone(s) 210 include microphone 110A. Microphone 110A may measure an acoustic response to the sound generated by speaker

108A. In some examples, microphone(s) 210 include multiple microphones. Thus, microphone 110A may be a first microphone and microphone(s) 210 may also include a second, a third, or any number of microphones. In some examples, microphone(s) 210 include microphones configured to measure sound in an auditory environment of user 104. In some examples, one or more of microphone(s) 210 in addition to microphone 110A may measure the acoustic response to the sound generated by speaker 108A.

In the example of FIG. 2, storage device(s) 202 may include sensor data 250. Storage device(s) 202 may further include a context unit 262 and an action unit 264. Context unit 262 and action unit 264 may include computer-executable instructions that processors 114A may execute. In general terms, context unit 262 may perform activities to determine a current context of hearing instrument 102A. Action unit 264 may select output settings of one or more of hearing instruments 102. In the example of FIG. 2, context unit 262 includes one or more classifiers 268 that may use sensor data 250 to classify activities or environments.

Processor(s) 112A may be configured to store samples from sensors 118A and microphones 210 in sensor data 250. For example, sensor of sensors 118A may generate samples at individual sampling rates. In some examples, sensor data 250 may include data representing a spectrogram of electromagnetic fields detected by telecoil 120A.

Context unit 262 may use sensor data 250 to determine values of a plurality of context parameters. For example, classifiers 268 of context unit 262 may use sensor data 250 to determine current values of a plurality of context parameters. For example, classifiers 268 may include a classifier that uses data from EEG sensor 234 to determine a value of a brain engagement parameter that indicates an engagement status of the brain of user 104 in conversation. In some examples, classifiers 268 include an activity classifier that uses data from PPG sensor 236 and/or IMU 226 to determine a value of an activity parameter that indicates an activity (e.g., running, cycling, standing, sitting, etc.) of user 104. Furthermore, in some examples, classifiers 268 may include an own-voice classifier that uses data from microphones 210, IMU 226, and/or other sensors to determine a value of an own-voice parameter indicating whether user 104 is speaking. In some examples, classifiers 268 may include an acoustic environment classifier that classifies an acoustic environment of hearing instrument 102A. An emotion classifier may determine a current emotional state of user 104 based on data from one or more of sensors 118A. In some examples, one or more of classifiers 268 use data from multiple sensors to determine values of context parameters. In some examples, classifiers 268 include a classifier that classifies types of electronic devices based on information generated by telecoil 120A.

Each context may correspond to a different combination of values of the context parameters. In some examples, the context parameters may include such things as an acoustic environment parameter, an activity parameter, an own-voice parameter, an emotion parameter, and an EEG parameter. In this case, a first context may correspond to a situation in which the value of the acoustic environment parameter indicates that user 104 is in a loud restaurant, the value of the activity parameter indicates that user 104 is sitting, the value of the own-voice parameter indicates that user 104 is talking, a value of the emotion parameter indicates user 104 is happy, and the value of the EEG parameter indicates that user 104 is mentally engaged. A second context may correspond to a situation in which the value of the acoustic environment parameter indicates that user 104 is in a loud restaurant, the value of the activity parameter indicates that user 104 is sitting, the value of the own-voice parameter indicates that user 104 is not talking, a value of the emotion parameter indicates user 104 is happy, and the value of the EEG parameter indicates that user 104 is mentally engaged. A third context may correspond to a situation in which the value of the acoustic environment parameter indicates that user 104 is in a loud restaurant, the value of the activity parameter indicates that user 104 is sitting, the value of the own-voice parameter indicates that user 104 is talking, a value of the emotion parameter indicates user 104 is tired, and the value of the EEG parameter indicates that user 104 is mentally engaged. Of course, context parameters may also define many other types of factors associated with the user or the environment.

For example, other example context parameters may include a task parameter, a location parameter, a venue parameter, a venue condition parameter, an acoustic target parameter, an acoustic background parameter, an acoustic event parameter, an acoustic condition parameter, a time parameter, and so on. The task parameter may indicate a task that user 104 is performing. Example values of the task parameter may include talking, listening, handling hearing instrument, typing on a keyboard, reading, watching television, and so on. The location parameter may indicate a location or area of user 104, which may be determined using a satellite navigation system, a wireless network map, or another type of localization system. The venue parameter may indicate a type of location, such as a restaurant, home, car, outdoors, theatre, work, kitchen, and so on. The venue conditions parameter may indicate conditions in the user's current venue. Example values of the venue conditions parameter may include hot, cold, freezing, comfortable temperature, humid, bright light, dark, and so on. The acoustic target parameter may indicate an acoustic target for user 104. In other words, the acoustic target parameter may indicate what type of sounds user 104 is trying to listen to. Example values of the acoustic target parameter may include speech, music, and so on. The acoustic background parameter may indicate a current type of acoustic background noise. Example values of the acoustic background parameter may include machine noise, babble, wind noise, other noise, and so on. The acoustic event parameter may indicate the occurrence of various acoustic events. Example values of the acoustic event parameter may include coughing, laughter, applause, keyboard tapping, feedback/chirping, or other types of acoustic events. The acoustic condition parameter may indicate a characteristic of the sound in the current environment. Example values of the acoustic condition parameter may include a noise volume level, a reverberation level, and so on. The time parameter may indicate a current time.

Action unit 264 may determine one or more actions to perform. For example, action unit 264 may adjust the output settings of hearing instrument 102A. The output settings of hearing instrument 102A may include a gain level, a level of noise reduction, directionality, and so on. In some examples, action unit 264 may determine whether to change the current output settings of hearing instrument 102A in response to context unit 262 determining that the current context of hearing instrument 102A has changed. Thus, action unit 264 may or may not change the output settings of hearing instrument 102A in response to context unit 262 determining that the current context of hearing instrument 102A has changed.

Example types of actions may include changes to noise and intelligibility settings, gain settings, changes to microphone directionality settings, changes to frequency shaping and directional settings to improve sound localization, switching to telecoil use, suggesting use of accessories such as remote microphones, and so on.

In some examples, processing system 114 may adjust one or more aspects of an application, such as companion application 324, based on context parameters. For example, companion application 324 may display different user interfaces or different input elements depending on the current context of hearing instruments 102. For instance, if the current context of hearing instruments 102 corresponds to the user being outside, companion application 324 may display an interface that prominently features controls for adjusting wind noise reduction. If the current context of hearing instruments 102 corresponds to the user being in a conversational setting, companion application 324 may display an interface for adjusting directional beamforming. If the current context of hearing instruments 102 corresponds to the user being in an induction hearing loop setting, companion application 324 may display an interface for adjusting the microphone and telecoil mix levels.

In some examples, activity monitoring unit 266 may determine, based on sensor data 250 (including data generated by telecoil 120A), whether user 104 is performing ADLs. In some examples, activity monitoring unit 266 may use a machine learning model to determine whether user 104 is performing ADLs. Furthermore, in some examples, action unit 264 may perform one or more actions based on whether user 104 is performing ADLs. For instance, action unit 264 may send an alert to a caregiver if user 104 is not performing ADLs. In some examples, action unit 264 may provide reminders to user 104 to perform specific ADLs (e.g., remember to make breakfast). In some examples, action unit 264 may provide reminders to user 104 to perform specific ADLs in a time period following the detection of a specific ADLs (e.g., remember to brush your teeth since you have eaten breakfast).

The discussion above with respect to FIG. 2 described actions with respect to only hearing instrument 102A. Components of hearing instrument 102B may concurrently perform similar processes. A context unit of hearing instrument 102B may determine a context of hearing instrument 102B separately from the context of hearing instrument 102A. In some examples, one of hearing instruments 102 determines a context and selects actions for both of hearing instruments 102. Hearing instruments 102A may receive data from sensors 118 and microphones 210 to determine values of context parameters. The context parameters may contribute to an overall context of the hearing instrument. Processing system 114 (e.g., action unit 264) may change output settings of the hearing instrument based on the context of the hearing instrument.

In some examples, processing system 114 may activate or deactivate telecoil 120A to reduce power consumption. For instance, processing system 114 may periodically determine whether a power level of a signal generated by telecoil 120A is above a threshold level and within specific bands. If so, processing system 114 may monitor the signal generated by telecoil 120A at a first rate. If not, processing system 114 may monitor the signal generated by telecoil 120A as a second rate lower than the first rate. Monitoring the signal generated by telecoil 120A at the lower rate may conserve resources, such as battery power and computational cycles. Furthermore, in some examples where user 104 uses two hearing instruments 102A, 102B, processing system 114 may coordinate the rates of monitoring telecoils 120A, 120B. For instance, if the power level of the signal generated by telecoil 120A is below the threshold level and/or outside the specific bands, processing system 114 may cease monitoring the signal generated by telecoil 120B while continuing to monitor the signal generated by telecoil 120A at a lower rate.

Figure 3:
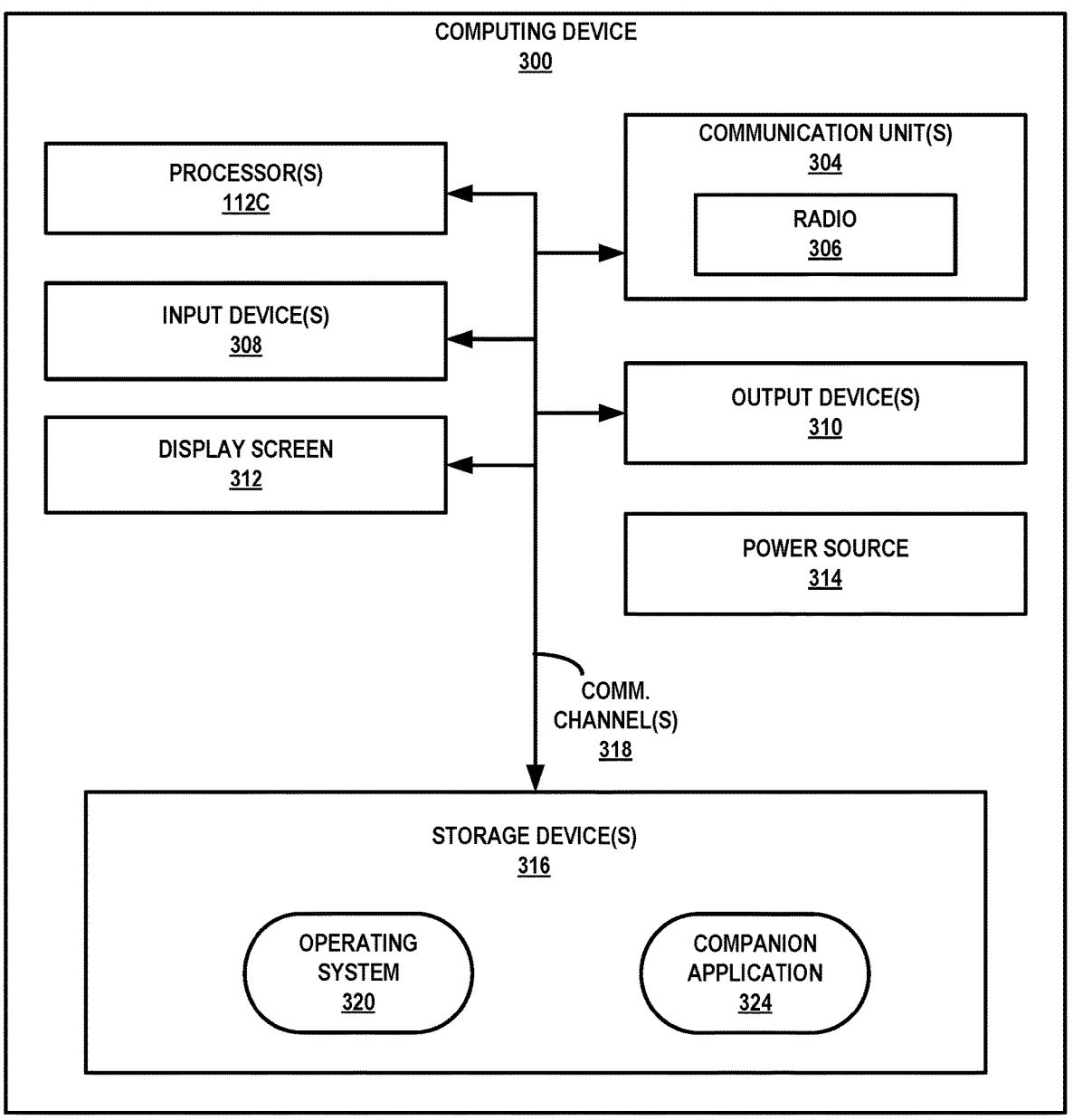
FIG. 3 is a block diagram illustrating example components of a computing device, in accordance with one or more techniques of this disclosure.

FIG. 3 is a block diagram illustrating example components of a computing device 300, in accordance with one or more techniques of this disclosure. FIG. 3 illustrates only one particular example of computing device 300, and many other example configurations of computing device 300 exist. Computing device 300 may comprise a computing device in computing system 106 (FIG. 1). For instance, computing device 300 may be a cloud-based server device that is remote from hearing instruments 102. In some examples, computing device 300 is a programming device, such as a smartphone, tablet computer, personal computer, accessory device, mesh network gateway device, or other type of device. In some examples, computing device 300 is used in a cloud computing system.

As shown in the example of FIG. 3, computing device 300 includes one or more processors 112C, one or more communication units 304, one or more input devices 308, one or more output devices 310, a display screen 312, a power source 314, one or more storage devices 316, and one or more communication channels 318. Computing device 300 may include other components. For example, computing device 300 may include physical buttons, microphones, speakers, communication ports, and so on. Communication channel(s) 318 may interconnect each of processor(s) 112C, communication unit(s) 304, input device(s) 308, output device(s) 310, display screen 312, and storage device(s) 316 for inter-component communications (physically, communicatively, and/or operatively). In some examples, communication channel(s) 318 may include a system bus, a network connection, an inter-process communication data structure, or any other method for communicating data. Power source 314 may provide electrical energy to components processor(s) 112C, communication unit(s) 304, input device(s) 308, output device(s) 310, display screen 312, and storage device(s) 316.

Storage device(s) 316 may store information required for use during operation of computing device 300. In some examples, storage device(s) 316 have the primary purpose of being a short-term and not a long-term computer-readable storage medium. Storage device(s) 316 may be volatile memory and may therefore not retain stored contents if powered off. Storage device(s) 316 may be configured for long-term storage of information as non-volatile memory space and retain information after power on/off cycles. In some examples, processor(s) 112C on computing device 300 read and may execute instructions stored by storage device(s) 316.

Computing device 300 may include one or more input devices 308 that computing device 300 uses to receive user input. Examples of user input include tactile, audio, gestural, and video user input. Input device(s) 308 may include presence-sensitive screens, touch-sensitive screens, mice, keyboards, voice responsive systems, microphones or other types of devices for detecting input from a human or machine.

Communication unit(s) 304 may enable computing device 300 to send data to and receive data from one or more other computing devices (e.g., via a communications network, such as a local area network or the Internet). For instance, communication unit(s) 304 may be configured to receive data sent by hearing instrument(s) 102, receive data generated by user 104 of hearing instrument(s) 102, receive and send request data, receive and send messages, and so on. In some examples, communication unit(s) 304 may include wireless transmitters and receivers that enable computing device 300 to communicate wirelessly with the other computing devices. For instance, in the example of FIG. 3, communication unit(s) 304 include a radio 306 that enables computing device 300 to communicate wirelessly with other computing devices, such as hearing instruments 102 (FIG. 1). Examples of communication unit(s) 304 may include network interface cards, Ethernet cards, optical transceivers, radio frequency transceivers, or other types of devices that are able to send and receive information. Other examples of such communication units may include BLUETOOTH™, 3G, 4G, 5G, 6G, and WI-FI™ radios, Universal Serial Bus (USB) interfaces, etc. Computing device 300 may use communication unit(s) 304 to communicate with one or more hearing instruments (e.g., hearing instruments 102 (FIG. 1, FIG. 2)). Additionally, computing device 300 may use communication unit(s) 304 to communicate with one or more other remote devices.

Output device(s) 310 may generate output. Examples of output include tactile, audio, and video output. Output device(s) 310 may include presence-sensitive screens, sound cards, video graphics adapter cards, speakers, liquid crystal displays (LCD), or other types of devices for generating output. Output device(s) 310 may include display screen 312.

Processor(s) 112C may read instructions from storage device(s) 316 and may execute instructions stored by storage device(s) 316. Execution of the instructions by processor(s) 112C may configure or cause computing device 300 to provide at least some of the functionality ascribed in this disclosure to computing device 300. As shown in the example of FIG. 3, storage device(s) 316 include computer-readable instructions associated with operating system 320 and a companion application 324. Execution of instructions associated with operating system 320 may cause computing device 300 to perform various functions to manage hardware resources of computing device 300 and to provide various common services for other computer programs.

Execution of instructions associated with companion application 324 may cause computing device 300 to configure communication unit(s) 304 to send and receive data from hearing instruments 102, such as data to adjust the settings of hearing instruments 102. In some examples, companion application 324 is an instance of a web application or server application. In some examples, such as examples where computing device 300 is a mobile device or other type of computing device, companion application 324 may be a native application.

In some examples, companion application 324 or another system operating on computing device 300 may determine, e.g., based on data from one or more of telecoils 120, a context of hearing instruments 102 and/or ADLs of user 104. In some examples, companion application 324 or another system operating on computing device 300 may perform actions based on the context of hearing instruments 102 and/or ADLs of user 104. In some examples, companion application 324 or another system operating on computing device 300 may train and/or apply a machine learning model to generate a modified microphone signal in accordance with one or more techniques of this disclosure.

Figure 4:
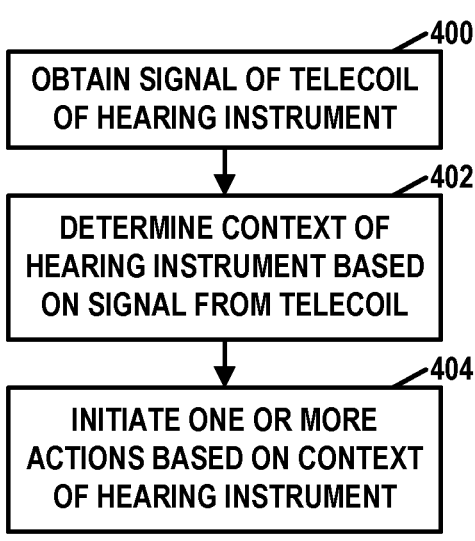
FIG. 4 is a flowchart illustrating an example operation in accordance with one or more techniques of this disclosure.

FIG. 4 is a flowchart illustrating an example operation in accordance with one or more techniques of this disclosure. The flowcharts of this disclosure are provided as examples. Other operations in accordance with the techniques of this disclosure may include more, fewer, or different actions.

In the example of FIG. 4, processing system 114 may obtain a signal from a telecoil (e.g., telecoil 120A, 120B) of a hearing instrument (e.g., hearing instrument 102A, 102B) (400). Processing system 114 may determine a context of the hearing instrument based at least in part on the signal from the telecoil (402). For example, processing system 114 may provide data representing the signal from the telecoil as input to a machine learning model that outputs one or more context parameters. In some examples, processing system 114 may determine the context of the hearing instrument based on signals from other sensors, such as one or more microphones, an IMU, and/or other sensors.

The machine learning model may be implemented in one of a variety of ways. For instance, in some examples, the machine learning model is implemented as a neural network model, such as a convolutional neural network (CNN) model. The CNN may take as input a 2-dimensional (2D) spectrogram of the signal from the telecoil. In some examples, the CNN may take, as input, as 40×40 matrix containing the 2D spectrogram. The CNN passes this input through a series of convolutional layers (e.g., 3, 4, 5, etc. convolutional layers). The convolution layers may apply convolutional filters and apply an activation function, such as a ReLU activation function or a sigmoid activation function. In different examples, the weights applied by neurons of the convolutional filters may have various bit depths, such 8, 16, 32, etc. In one example, the CNN may include three layers: a convolutional layer, a pooling layer, and an output layer. Output of the CNN may include values of one or more context parameter. In some examples, output of the CNN may include a value that indicates a type of electronic device. Processing system 114 may then determine (e.g., by applying a mapping or other function) the type of electronic device to values of one or more context parameters. The CNN may be trained using a supervised learning paradigm. A cost function may be used in training the CNN. Example cost functions that may be used in training the CNN may include a root mean squared error (RMSE) cost function or another type of cost function. In other examples, the neural network model may include a series of fully connected layers.

In some examples, the machine learning model is implemented using a Gaussian mixture model. In this example, telecoil signals for different types of electronic devices may be observed and one or more numerical values (e.g., statistics regarding intensities at various frequencies) characterizing each telecoil signal may be generated. Statistics, such as the mean and variance, of the numerical values for each type of electronic device may also be maintained. During use, processing system 114 may generate numerical values characterizing the signal generated from the telecoil. Processing system 114 may use these numerical values to determine which type of electronic device is most likely, given the statistics regarding for the types of electronic devices. Processing system 114 may determine values of one or more context parameters based on the determined type of electronic device. In some examples, the context parameters may include a location parameter that processing system 114 determines based on situation-specific loops or beacon devices. Such situation-specific loops or beacon devices may propagate modulated signals. Processing system 114 may demodulate the signals to identify locations associated with the loops or beacon devices. For instance, processing system 114 may demodulate a signal from a loop located in a toilet or shower/tub area to determine that the user visited a bathroom. This technique may also be used for determining ADLs.

In some examples, the machine learning model includes a support vector machine (SVM). In this example, processing system 114 may generate numerical values characterizing the signal generated from the telecoil (e.g., statistics regarding intensities at various frequencies). The numerical values generated from the signal generated by the telecoil may be stored as a vector. Such vectors of numerical values may be generated based on numerous examples of different types of electronic devices. Processing system 114 may perform a SVM learning process that learns to determine hyperplanes that separate different classes. The classes may correspond to different types of electronic devices.

In some examples, processing system 114 may prompt the user to provide answers to queries that ask the user to identify or confirm contextual information. Processing system 114 may use confirmed contextual information for training the machine learning model.

Processing system 114 may initiate one or more actions based on the context of the hearing instrument (404). Examples of actions may include activation or adjusting specific noise reduction features, changing the output gain of hearing instruments 102, generating notifications, and so on.

In some examples, processing system 114 may determine a type of vehicle (e.g., a manufacturer and model of a vehicle) that user 104 is traveling in. If the vehicle is not the vehicle that user 104 typically drives, processing system 114 may perform an action that biases the sound processing away from environmental awareness to a sound generation profile that is more relaxing or interesting (e.g., listening to the radio, having a conversation without additional environmental sounds that may be helpful when driving the vehicle).

In some examples, processing system 114 may determine the context based on the signal from the telecoil, a velocity of the user (e.g., as detected by the IMU of the hearing instrument), and microphone signals. In this example, an increased frequency shift in harmonics observed in the signal generated by the telecoil and an increase in velocity of the user may be related to an increase in loudness of sound measured by the microphones when the user is traveling in a vehicle. Accordingly, processing system 114 may perform an action that increases noise reduction to compensate for vehicle and/or road noise. Processing system 114 may also track acoustic properties of the vehicle and/or road noise based on the signal from the telecoil.

In some examples, hearing instruments 102 may enter a vehicle having a wireless connection that hearing instruments 102 are configured to use. For example, hearing instruments 102 may be paired with a Bluetooth connection of the vehicle. Processing system 114 may detect the presence of the vehicle based on signals from the telecoil and determine whether to connect to the wireless connection of the vehicle in accordance with user preferences. In another example, a mobile phone of user 104 may be paired with hearing instruments 102 and a vehicle. Based on detecting the presence of the vehicle based on signals from the telecoil, processing system 114 may control whether the mobile phone stays connected to the wireless connection with hearing instruments 102 or changes the wireless connection to the vehicle, e.g., according to user preferences.

Figure 5:
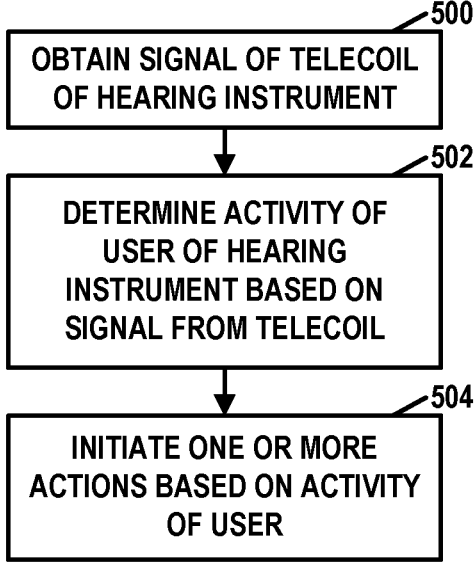
FIG. 5 is a flowchart illustrating an example operation in accordance with one or more techniques of this disclosure.

FIG. 5 is a flowchart illustrating an example operation in accordance with one or more techniques of this disclosure. In the example of FIG. 5, processing system 114 may obtain a signal from a telecoil (e.g., telecoil 120A, 120B) of a hearing instrument (e.g., hearing instrument 102A, 102B) (500). Processing system 114 may determine an activity of a user (e.g., user 104) of the hearing instrument based at least in part on the signal from the telecoil (502). For example, processing system 114 may determine a type of electronic device in a vicinity of telecoil based on the signal from the telecoil. Processing system 114 may determine the type of electronic device in accordance with any of the examples provided elsewhere in this disclosure that determine a type of electronic device. For instance, processing system 114 may apply a neural network model, Gaussian mixture model, support vector machine model, or other type of machine learning model to determine the type of electronic device. Processing system 114 may use the information about the type of electronic device, along with other data, to determine an activity of user 104. The other data may include data from sensors of hearing instruments 102, such as data from an IMU (e.g., IMU 226), data from an EEG sensor (e.g., EEG sensor 234), data from a PPG sensor (e.g., PPG sensor 236), data from a temperature sensor (e.g., temperature sensor 238), location data (e.g., from a satellite positioning system), or data from additional sensors (e.g., additional sensors 244).

In some examples, processing system 114 may apply a machine learning model to determine the activity of the user. For instance, processing system 114 may use data indicating the type of electronic device in the vicinity of the telecoil, along with other data, as input to a neural network, as part of a vector for a clustering algorithm (e.g., a k-means clustering algorithm), a vector for a support vector machine, or another type of machine learning model. Example details of machine learning models are described with respect to FIG. 4.

Example activities may include activities of daily living, such as watching television, sleeping, brushing teeth, showering, drying hair, using the microwave, riding an elevator, traveling on a train, car, or other vehicle, or any other definable and detectable activity.

Processing system 114 may initiate one or more actions based on the activity of the user (504). For example, processing system 114 may generate reminders to perform specific activities if user 104 is not performing the activities or has not performed the activities within a specific time interval. In another example, processing system 114 may send notifications to one or more caregivers if user 104 is not performing the activities.

In some examples, where processing system 114 determines activities of daily living, processing system 114 may maintain a daily to-do list for activities. For instance, the user's to-do list may include brushing their teeth, using specific appliances to prepare or store food, travel in specific vehicles, and so on. Processing system 114 may provide reminders based on the to-do list, such as reminders of upcoming or missed activities. In some examples, if user 104 skips part of their routine, processing system 114 may assist with simplifying the user's schedule and/or help user 104 get back on track. Thus, in some examples, processing system 114 may determine an activity of user 104 of hearing instruments 102 based at least in part on the signal from the telecoil. Processing system 114 may update a to-do list for user 104 to indicate completion of the activity.

As mentioned above, example activities may include riding in specific types of vehicles. In one example, processing system 114 may determine that user 104 is riding in a train. Processing system 114 may further determine, based on signals obtained from the telecoil indicative of the number of times doors of the train have opened, a number of stops that the train has completed (or stations at which the train has stopped). In some examples, processing system 114 may further use other types of data, such as audio data (e.g., audio of stop announcements) generated by hearing instruments 102 to determine the number of times the train has stopped. The other types of data may include time motion data, such as time spent moving, acceleration, deceleration, speed, estimated distance traveled, and so on. In some examples, processing system 114 may use the telecoil signals, the audio data, along with potentially other data (e.g., location data, accelerometer data, etc.) as input to a machine learning model (e.g., of the types described elsewhere in this disclosure) to determine the number of times the train has stopped. System 114 may perform an action, such as an alert to user 104 that their stop/station is approaching, based on the number of times the train has stopped. A similar example may be provided with respect to buses. Performing such actions may be useful especially in scenarios where satellite navigation systems are unavailable, such as in a subway.

In some examples, processing system 114 may determine, based on the signals of the telecoil, that user 104 is riding in an airplane. In such examples, processing system 114 may initiate activities, such as increasing noise cancelation, disabling cellular connectivity, connecting to or initiating connection to onboard entertainment systems, and so on. In some examples, processing system 114 may determine, based on the signals of the telecoil, that user 104 is riding in an internal combustion vehicle, such as a car or motorcycle. For instance, the signals of the telecoil may indicate the actions of an alternator or spark plugs.

In some examples, processing system 114 may detect conditions or states of devices based on signals from telecoils. For example, processing system 114 may be able to determine, based on the signals from telecoils, whether a battery or a charging rate of a device is low, whether spark plug timing is typical, and so on.

Figure 6:
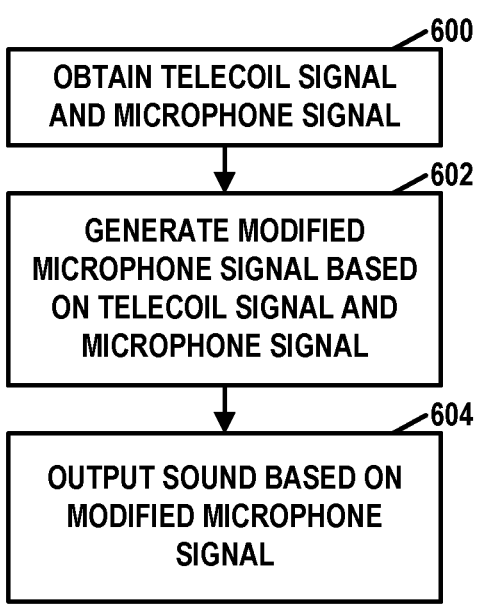
FIG. 6 is a flowchart illustrating an example operation in accordance with one or more techniques of this disclosure.

FIG. 6 is a flowchart illustrating an example operation in accordance with one or more techniques of this disclosure. In some examples, processing system 114 may use the signal from a telecoil of a hearing instrument and a signal from a microphone of the hearing instrument to perform voice enhancement or noise reduction. The telecoil may be in an electromagnetic field generated by a device (e.g., a loop, remote microphone, audio system, television, telephone, etc.) to transmit voice data to hearing instruments. In the example of FIG. 6, processing system 114 may use one or more voice signals from sources other than or in addition to a telecoil, e.g., a Bluetooth, 900 MHz, or FM accessory, etc. However, for ease of explanation, this disclosure may use the term "telecoil signal" to describe the signal from the telecoil or such other sources. The signal from the microphone may include a combination of a noise signal and a voice signal. The noise signal may be attributable to other people talking, road noise, wind noise, background music, and so on. Processing system 114 may compare the signal from the telecoil with the signal from the microphone to remove or reduce the noise signal in the signal generated by the microphone. For instance, processing system 114 may subtract the signal associated with the telecoil (i.e., the telecoil signal) from the signal generated by the microphone (i.e., the microphone signal) to isolate the noise signal in the microphone signal.

Processing system 114 may generate a modified microphone signal by using the isolated noise signal to reduce the noise signal in the microphone signal. One or more hearing instruments 102 may generate sound based on the modified microphone signal. In some embodiments, processing system 114 may selectively reduce noise in frequency bands which comprise or encapsulate the frequency bands with a threshold amount of power within the telecoil signal. In this way, user 104 may be able to hear a potentially more "full" or natural sounding mixture of noise and voice than if the output were based only on the telecoil signal, while also enhancing the intelligibility of the voice signal. It will also be appreciated that these techniques may also be applied to non-voice signals, such as music.

The telecoil signal may be frequency bandwidth limited (e.g., 100-5000 Hz, relative to the microphone frequency range e.g., 20-12 KHz). Processing system 114 may use the telecoil signal to inform processing across a full range of the microphone signal, not just within the frequency range of the telecoil signal itself.

Thus, in the example of FIG. 6, a hearing instrument (e.g., hearing instrument 102A, 102B), may obtain a telecoil signal and a microphone signal (600). The telecoil signal and the microphone signal may include embedded voice signals. The hearing instrument may generate a modified microphone signal based on the telecoil signal and the microphone signal (602). The modified microphone signal may include less noise and/or increased voice intelligibility. The hearing instrument may output sound based on the modified microphone signal (604).

FIG. 7 is a flowchart illustrating an example operation in accordance with one or more techniques of this disclosure. In some examples, a computing system (e.g., computing system 106, a cloud computing system, etc.) may obtain signals generated by telecoils (e.g., "telecoil signals") of hearing instruments of one or more users and signals generated by microphones (e.g., "microphone signals") of the same hearing instruments for the same time periods. Thus, the computing system may obtain pairs of signals (i.e., a telecoil signal and a microphone signal) that represent same voice utterance. The computing system may use such pairs of signals as a training dataset to train a machine learning model to automatically reduce noise, enhance speech intelligibility, or perform other operations. For instance, in this example, the computing system may provide the microphone signal (which includes a voice signal and a noise signal) as input to a neural network model (e.g., in the form of a 2D spectrogram). The computing system may train the neural network model to generate a signal similar to (e.g., that resembles) the telecoil signal. For instance, the computing system may perform a forward pass through the neural network model using the microphone signal as input. The computing system may apply an error function (e.g., a loss function) to determine an error value based on the output of the neural network model and the telecoil signal. The computing system may then perform a backpropagation process to update weights of the neural network model based on the error value. In this example, the neural network model may have a U-Net architecture, a V-Net architecture, or another neural network architecture. The neural network model may use a ReLU activation function, or another type of activation function. The input to the neural network model may represent a time segment of the microphone signal as a matrix. In some examples, the neural network model includes up to 3 hidden layers.

After the neural network model is at least partially trained, the neural network model may be transferred to individual hearing instruments. The individual hearing instruments may then apply the neural network model to perform noise reduction, enhance speech intelligibility, or perform other actions. Because the computing system may obtain such pairs of signals from hearing instruments of multiple users in many different situations, the neural network may be well trained to perform noise reduction, enhance speech intelligibility, or perform other actions in many situations.

In some examples, processing system 114 may use classifications determined based on signals from the telecoil to generate training examples for use in training another machine learning model. For example, processing system 114 may receive telecoil signals, along with associated audio data and motion data from hearing instruments. In this example, processing system 114 may use the telecoil signal to determine an activity, context parameter, presence of an object, or other classification. Processing system 114 may then generate training data sets with the audio data and/or motion data associated with a telecoil signal as training input and the expected output being the classification determined from the telecoil signal. In this way, processing system 114 may train a machine learning model to generate an equivalent classification based on the audio data and/or motion data instead of telecoil signals. This may be useful for hearing instruments that do not include telecoils.

Thus, as shown in the example of FIG. 7, processing system 114 may obtain telecoil signals and corresponding microphone signals (700). Processing system 114 may use the telecoil signals and corresponding microphone signals to train a machine learning model (e.g., a neural network model) to generate modified microphone signals (702). The modified microphone signals may resemble the telecoil signals.

After the machine learning model is at least partially trained, processing system 114 (e.g., a portion of processing system at hearing instruments 102) may obtain a new microphone signal (e.g., without a corresponding telecoil signal) (704). Processing system 114 (e.g., a portion of processing system at hearing instruments 102) may apply the machine learning model to the new microphone signal to generate a modified microphone signal (706). One or more of hearing instruments 102 may output sound based on the modified microphone signal (708).

In some examples, the telecoil signals and microphone signals may be anonymized prior to use as training data. Anonymizing the signals may include the hearing instruments passing the signals through one or more autoencoders that are trained to reproduce the signals. The features produced by an encoder portion of an autoencoder may be provided as a signal for the training data. Thus, the machine learning model may be trained to produce features that match the features produced by an autoencoder based on telecoil signals. The weights of the decoder portion of the autoencoder are not disclosed to the computing system (or entity that uses the computing system) that trains the machine learning model. Subsequently, the hearing instrument may apply the encoder portion of the autoencoder to a new microphone signal and then provide the resulting features as input to the trained machine learning model. The trained machine learning model outputs a set of features that the hearing instrument may provide as input to the decoder portion of the autoencoder. The decoder portion of the autoencoder may output an audio signal that resembles a signal that a telecoil would produce if the telecoil were receiving the voice signal embedded in the new microphone signal.

In some examples, the pairs of signals may be obtained only from hearing instruments (e.g., hearing instruments 102) of a single user (e.g., user 104). In such examples, the training may occur at hearing instruments 102 or a device associated with the user, such as a mobile phone of the user.

Figure 8:
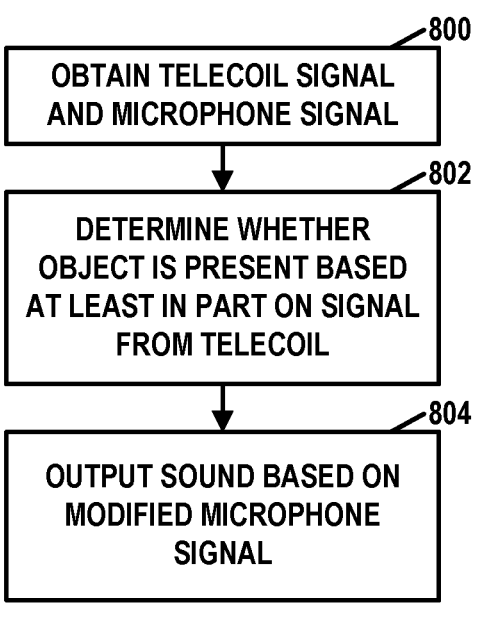
FIG. 8 is a flowchart illustrating an example operation in accordance with one or more techniques of this disclosure.

FIG. 8 is a flowchart illustrating an example operation in accordance with one or more techniques of this disclosure.

In this example of FIG. 8, processing system 114 may obtain a signal from a telecoil (e.g., telecoil 120A, 120B) of a hearing instrument (e.g., hearing instrument 102A, 102B) (800). Processing system 114 may determine whether an object is present based at least in part on the signal from the telecoil (802). For example, processing system 114 may provide data representing the signal form the telecoil as input to a machine learning model that outputs indications of whether one or more objects are present in the environment of the user. The machine learning model may be implemented in a manner similar to the machine learning models described elsewhere in this disclosure.

For example, processing system 114 may detect the presence of a magnetic beacon, such as a small induction loop. The magnetic beacon may be attached to various object or positioned in various locations. For instance, a magnetic beacon may be position on, near, or about a toilet, at the threshold of a door, in a bathroom, or at other locations. Similar beacons can be placed at chairs to determine duration of sedentary activity, or incorporated into dining wear or tables (e.g., plates or bowls) to completion of feeding activities, etc.

Processing system 114 may initiate one or more actions based on the presence of the object (804). For example, processing system 114 may cause hearing instruments 102 to output audio notifications regarding the presence of the object. For instance, processing system 114 may cause hearing instruments 102 to output an audio warning regarding an approaching vehicle, such as a golf cart, lawn mower, electric vehicle, etc. In some examples, processing system 114 may cause hearing instruments 102 to output audio and/or haptic information that guide user 104 toward the object.

Detecting the magnetic beacon may help people, especially vision-impaired people, find or navigate to objects. In some examples, processing system 114 may generate a log of events based on detected magnetic beacons.

In some examples, processing system 114 may detect the presence of specific devices, such as an electric lawnmower, machinery, electric fence, or other type of device to avoid. In this example, processing system 114 may initiate actions, such as audible and/or haptic indications, regarding the presence of the devices. For instance, processing system 114 may generate an audible warning that a lawnmower or other machinery is in use nearby. In another example, processing system 114 may detect and alert the user to the presence of an electric vehicle that is operating more quietly than a combustion vehicle. In another example, processing system 114 may detect the presence of an in-ground electrical barrier, such as those used to train dogs. In this example, processing system 114 may alert the user to the presence of the in-ground electrical barrier, e.g., as to warn the user that they are potentially entering the territory of an off-leash dog. In some another example involving an in-ground electrical barrier, processing system 114 may generate an alert to a caregiver if user 104 crosses the in-ground electrical barrier, e.g., to notify the caregiver that user 104 is leaving a location. In instances where user 104 has dementia, such alerts may be useful to help reduce the risk of user 104 wandering away from a facility.

In some examples, processing system 114 may detect the presence of a beacon or electromagnetic loop that indicates a walking area, such as a crosswalk or path. In such examples, processing system 114 may initiate actions, such as audio and/or haptic guidance, to guide the user to and along the walking area. In some such examples, processing system 114 may detect the presence of specific types of objects (e.g., walking areas, curbs, etc.) only after determining that the user is outdoors. Thus, in some examples, processing system 114 may detect, based on the signal from the telecoil, that the user is in a vicinity of an electrical loop embedded in a walking area. Based on the user being in the vicinity of the electrical loop embedded in the walking area and the activity of the user being walking, processing system 114 may initiate one or more actions to guide the user along the walking area. In some examples where a beacon indicates a walking area, an electromagnetic signal generated by the beacon may be modulated to encode audio data that indicates whether it is safe to cross a street, how much time remains before it is safe to cross the street, how much time remains to safely cross the street, or other information. Telecoils 120 of hearing instruments 102 may receive the electromagnetic signal generated by the beacon and speakers 108 of hearing instruments may output audio data based on the information modulated in the electromagnetic signals.

Likewise, processing system 114 may detect the presence of specific types of objects (e.g., escalators, elevators, etc.) after determining that the user is indoors.

In some examples, processing system 114 may detect, based on signals from telecoils, the presence of a transmitting telecoil. Such transmitting telecoils are frequently used in venues, such as auditoriums, concert halls, and religious facilities, to transmit audio signals from microphones to telecoils of hearing instruments. However, some users may prefer the sound detected by microphones of their hearing instruments as opposed to sound received via the telecoils, e.g., because the user may perceive the acoustics of the venue to improve the resulting sound. Acoustic feedback may arise from sound generated by receivers of the hearing instruments being detected by microphones of the hearing instruments. The resulting acoustic feedback may be perceived as a tone that increases in pitch and intensity. Hearing instruments are configured to apply a filter that suppresses output of tones at specific pitches. Entrainment is a phenomenon that may occur when adaptive feedback cancelation is applied to input signals and the adaptive feedback cancelation attempts to cancel a tonal input to a hearing instrument. Entrainment may degrade the listening experience. If the user is attempting to listen to music via the microphones of their hearing instruments (as opposed to via the telecoils), the cancelation of such tones may diminish the sound quality perceived by the user. For instance, the user may perceive certain notes of the music to be missing. In accordance with a technique of this disclosure, in response to detecting the presence of a transmitting telecoil, processing system 114 may adjust the feedback suppression system to reduce or stop suppressing pitches that the user wants to hear.

In some examples, the context parameters may include a context parameter indicating whether the user is indoors or outdoors. Processing system 114 may determine this context parameter based on ambient magnetic signals. In general, ambient magnetic signals are lower outdoors because of increased distance from electrical devices, such as electrical conductors and electronic devices. Thus, if processing system 114 determines that a level of the ambient magnetic signals is below a threshold, processing system 114 may determine that the user is outdoors. Processing system 114 may perform various activities based on a determination that the user is outdoors. For example, processing system 114 may adjust settings of hearing instruments 102, e.g., to increase wind and water noise suppression. In some examples, based on a determination that the user is outdoors, processing system 114 may adjust settings of an activity classifier. For instance, processing system 114 may determine whether the user is using a stationary bicycle or a real bicycle, running on a treadmill or running on outside, etc. In some examples where processing system 114 adjusts settings of the activity classifier, processing system 114 may ignore some activity classifications and favor or amplify other activity classifications. In some examples, based on a determination that user 104 is indoors or outdoors, processing system 114 may change fall detection settings, change settings of location services to update more frequently, or change other settings of hearing instruments 102 or other devices. In some examples, based on a determination that user 104 is indoors or outdoors, processing system 114 may change the power output of wireless radios to improve wireless performance while outdoors, e.g., because there may be fewer reflective surfaces outdoors.

In some examples, processing system 114 may use sensor fusion techniques to determine whether user 104 is indoors or outdoors. For instance, when user 104 is outdoors, telecoils 120 of hearing instruments 102 may sense lower electrical activity. At the same time, Bluetooth radios of hearing instruments 102 may detect weaker signal strength in communications because there may be fewer reflective surfaces outdoors. Thus, processing system 114 may determine, based on a combination of lower electrical activity detected by telecoils 120 and weaker Bluetooth signal strength that hearing instruments 102 are outdoors. In some examples, the signals strength of wireless signals used for communication between left and right hearing instruments may differ depending on whether the hearing instruments are indoors or outdoors. Similarly, the signals strength of wireless signals used for communication between hearing instruments 102 and a mobile device (e.g., a mobile phone of user 104) may differ depending on whether the hearing instruments are indoors or outdoors. Processing system 114 may use these signal strengths as factors in determining whether hearing instruments 102 are indoors or outdoors.

In some examples where processing system 114 determines whether the user is indoors or outdoors, processing system 114 may adjust parameters related to fall risk. For instance, processing system 114 may increase sensitivity of a fall-detection system to potential falls when the user is outdoors. In some examples, processing system 114 may reduce noise, lower the output of transient sounds, or perform other actions to help users focus more when they are outside. In another example, processing system 114 may determine that the user is indoors and may help to mitigate fall risks by warning the user of potential indoor fall risks, such as escalators, moving walkways, and so on. Falls may be detected based on signals from IMUs, microphones, and or other sensors.

Figure 9:
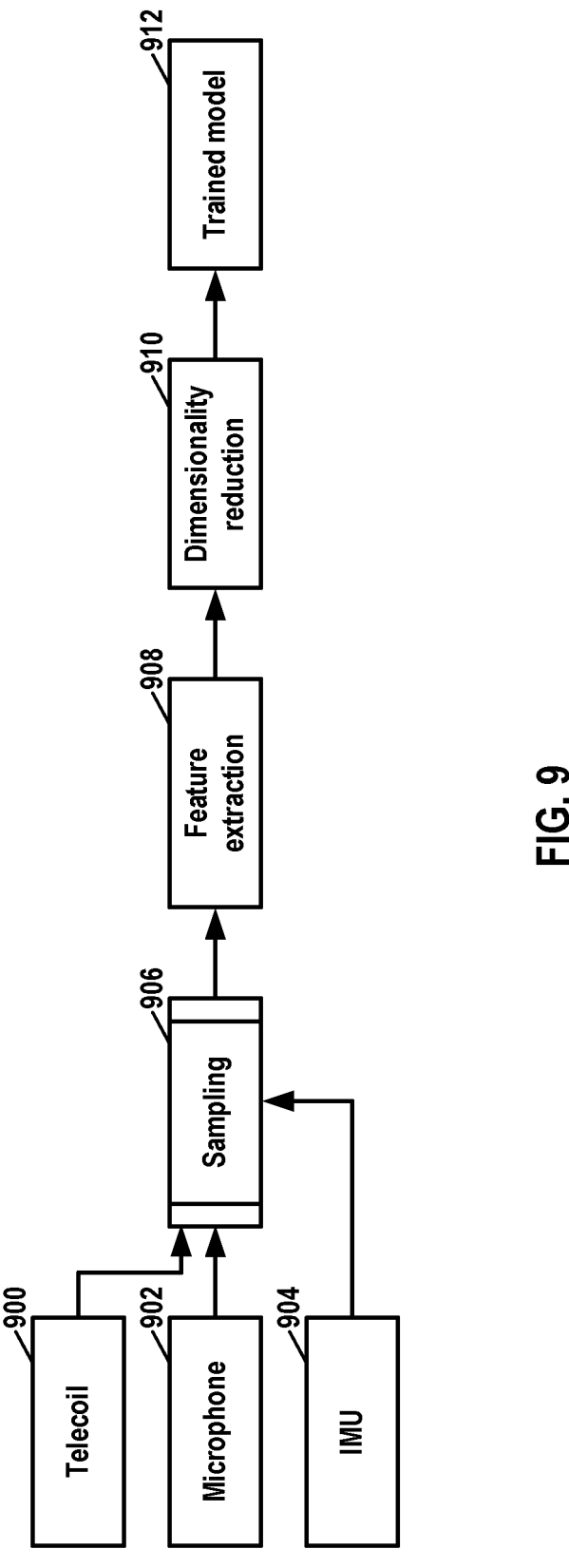
FIG. 9 is a flow diagram illustrating an example of data preprocessing in accordance with one or more techniques of this disclosure.

FIG. 9 is a flow diagram illustrating an example of data preprocessing in accordance with one or more techniques of this disclosure. In the example of FIG. 9, processing system 114 may receive signals from a telecoil 900, a microphone 902, and an IMU 904. Telecoil 900, microphone 902, and IMU 902 may be included in one of hearing instruments 102, a wearable device, a smartphone, or another type of device. Processing system 114 may apply a sampling process (906) to the signals from telecoil 900, microphone 902, and IMU 904. In some examples, the sampling process may generate samples of the signals. Each of the samples may represent a segment of a signal having a defined time duration, such as 1 second, 2 seconds, 5 seconds, and so on.

Processing system 114 may perform a feature extraction process (908) on the samples generated during the feature extraction process. The feature extraction process extracts features based on the samples. Example features may include a zero-crossing rate, spectral energies, root mean square, and so on. The features may be stored in an M×N matrix.

Additionally, processing system 114 may perform a dimensionality reduction process to generate input data (910). Dimensionality reduction may reduce the dimensions of the M×N matrix, e.g., to a matrix having a width less than M and/or a height less than N. In some examples, processing system 114 may use a principal component analysis as part of the dimensionality reduction process. The principal component analysis may compute the largest possible variance and the most uncorrelated data present in the matrix. Processing system 114 may provide the input data as input to a machine learning model (912).

Figure 10:
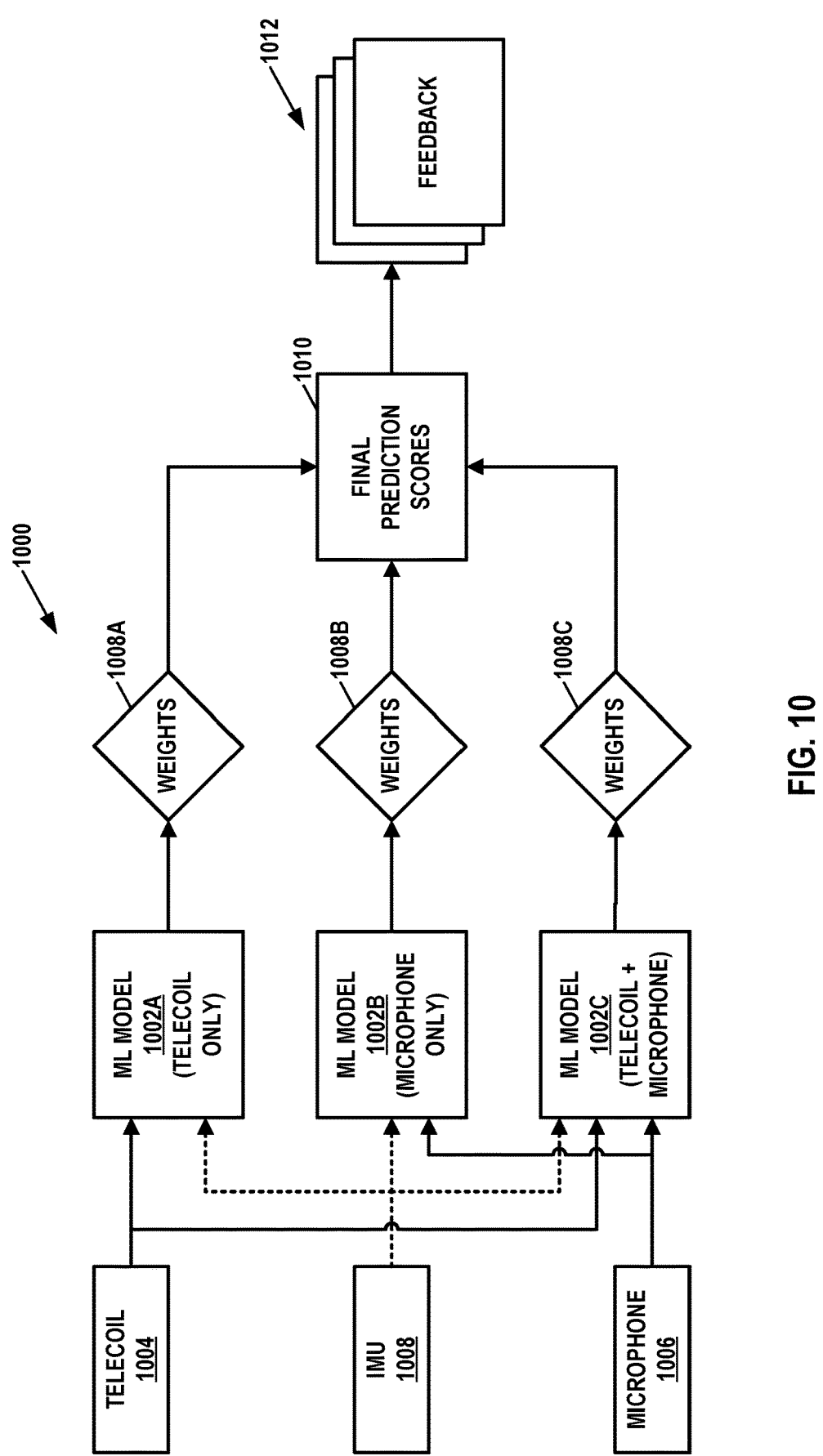
FIG. 10 is a flow diagram of an example ensemble learning model in accordance with one or more techniques of this disclosure.

FIG. 10 is a flow diagram of an example ensemble learning model 1000 in accordance with one or more techniques of this disclosure. In the example of FIG. 10, ensemble learning model 1000 includes an ensemble (i.e., a plurality) of ML models 1002A, 1002B, and 1002C (collectively, "ML models 1002"). In other examples, ensemble learning model 1000 may include more or fewer ML models than shown in the example of FIG. 10. ML models 1002 may receive input from one or more of telecoil 1004, a microphone 1006, and an IMU 1008. Specifically, in the example of FIG. 10, ML model 1002A receives input only from telecoil 1004, ML model 1002B receives input from only from microphone 1006, and ML model 1002 receives input from telecoil 1004 and microphone 1006. In another example, as indicated by the dashed lines in FIG. 10, one or more of ML models 1002 further receives input from IMU 1008. ML models 1002 may be implemented in various ways. For example, ML models 1002 may be implemented as neural networks, Gaussian mixture models, Support Vector Machines, or other types of ML models. In some examples, ML models 1002 may each be the same type of ML model or two or more of ML models 1002 may be different types of ML models. Example implementation details for these types of ML models are provided elsewhere in this disclosure, e.g., with respect to FIG. 4.

Processing system 114 may apply ML models 1002 to their inputs respective inputs. Thus, each of ML models 1002 independently generates output data. For example, each of ML models 1002 may independently predict the value of a context parameter, predict an activity of the user, predict the presence of an object, and/or make other predictions.

Processing system 114 may apply weights 1008A, 1008B, 1008C (collectively, "weights 1008") to the outputs of ML models 1002. For example, each of ML models 1002 may output one or more numerical values corresponding to different classes (e.g., different contexts, different activities, different objects, etc.). Processing system 114 may generate first weighted values by multiplying weights 1008A and the numerical values output by ML model 1002A, generate second weighted values by multiplying weights 1008B and the numerical values output by ML model 1002B, and generate third weighted values by multiplying weights 1008C and the numerical values output by ML model 1002C. Processing system 114 may determine final prediction scores (1010) based on the first, second, and third weighted values. For instance, in an example where the output of ML models 1002 includes numerical values for a plurality of classifications, processing system 114 may sum the first, second, and third weighted values for each of the classifications. In this example, processing system 114 may select the classification associated with the highest sum. In an example where each of ML models 1002 only outputs a single numerical value, processing system 114 may sum the weighted values to generate a final score. It may initially be unclear which types of inputs yield the best prediction results. Applying weights 1008 to the output of ML models that have different inputs may allow ensemble learning model 1000, as a whole, to generate better prediction results by giving more weight to the outputs of specific ML models.

Furthermore, in the example of FIG. 10, processing system 114 may receive feedback 1012. Feedback 1012 may indicate whether a prediction generated by ensemble learning model 1000 was or was not correct. In some examples, processing system 114 may adjust weights 1008 based on feedback 1012. For example, processing system 114 may maintain statistics based on feedback 1012 that indicate correctness of each of ML models 1002. If processing system 114 determines, based on the statistics, that one of ML models 1002 consistently produces correct classifications, processing system 114 may relatively increase the weight applied to the output for the ML model. Likewise, if processing system 114 determines, based on the statistics, that one of ML model 1002 consistently produces incorrect classifications, processing system 114 may relatively decrease the weight applied to the output for the ML model.

As mentioned above, different electronic devices may generate electromagnetic fields having different frequencies. The following is a list of electronic devices and the ranges of frequencies of electromagnetic fields generated by the electronic devices.

10 kV to 72.5 kV underground cables—Frequency ranges: 50 Hz
110 kV to 150 kV transmission line—Frequency ranges: 50-60 Hz
161 kV power transmission line—Frequency ranges: 50-60 Hz
200 kV power transmission line—Frequency ranges: 50-60 Hz
220 kV to 300 kV power transmission line—Frequency ranges: 50-60 Hz
220 kV underground cable—Frequency ranges: 50 Hz
275 kV underground cable—Frequency ranges: 50 Hz
345 kV power transmission line—Frequency ranges: 50-60 Hz
380 kV to 420 kV underground cable—Frequency ranges: 50 Hz
380 kV to 440 kV power transmission line—Frequency ranges: 50-60 Hz
500 kV to 765 kV power transmission line—Frequency ranges: 50-60 Hz
72.5 kV to 150 kV underground cables—Frequency ranges: 50 Hz
Acousto-magnetic system—Frequency ranges: 40-50 Hz, 20-135 kHz
Air cleaner—Frequency ranges: 50-60 Hz
Air conditioner—Frequency ranges: 50-60 Hz
Angle grinder—Frequency ranges: 50-60 Hz
Aquarium pump—Frequency ranges: 50-60 Hz
Article Surveillance—Frequency ranges: 10 Hz-20 kHz
Audio system—Frequency ranges: 0 Hz, 30 Hz-20 kHz
Band grinder—Frequency ranges: 50-60 Hz
Battery charger—Frequency ranges: 50-60 Hz
Blender—Frequency ranges: 50-60 Hz
Blowdryer—Frequency ranges: 50-60 Hz
Boiler—Frequency ranges: 50-60 Hz
Boiler and instantaneous water heater—Frequency ranges: 50-60 Hz
Bread cutter—Frequency ranges: 50-60 Hz Bread machine—Frequency ranges: 50-60 Hz
Breadmaker—Frequency ranges: 50-60 Hz
Burglar alarm—Frequency ranges: 50-60 Hz
Buzzsaw—Frequency ranges: 50-60 Hz
Cabinet fan—Frequency ranges: 50-60 Hz
Cabinet ventilator—Frequency ranges: 50-60 Hz
Cable car—Frequency ranges: 0 Hz, 180-300 Hz
Can opener—Frequency ranges: 50-60 Hz
Car (with combustion engine)—Frequency ranges: 50-60 Hz, ≤20 Hz
Car polisher—Frequency ranges: 50-60 Hz
Carving knife—Frequency ranges: 50-60 Hz
Cathode-ray tube screen—Frequency ranges: 50-60 Hz, 50 Hz-15.625 kHz
Cell phone charger—Frequency ranges: 50-60 Hz
Chainsaw—Frequency ranges: 50-60 Hz
Charger—Frequency ranges: 50-60 Hz
Charger for cordless telephones—Frequency ranges: 50-60 Hz
Charging station—Frequency ranges: 50-60 Hz
Circular saw—Frequency ranges: 50-60 Hz
Citrus juicer—Frequency ranges: 50-60 Hz
Climatization—Frequency ranges: 50-60 Hz
Coffee grinder—Frequency ranges: 50-60 Hz
Coffee machine—Frequency ranges: 50-60 Hz
Coffee mill—Frequency ranges: 50-60 Hz
Computer—Frequency ranges: 50-60 Hz
Computer and office devices—Frequency ranges: 50-60 Hz
Consumer electronics—Frequency ranges: 0 Hz, 30 Hz-20 kHz
Cooker—Frequency ranges: 50-60 Hz
Cooling appliances—Frequency ranges: 50-60 Hz
Cordless screwdriver—Frequency ranges: 50-60 Hz
Crockpot—Frequency ranges: 50-60 Hz
Deep fryer—Frequency ranges: 50-60 Hz
Deep-fat fryer—Frequency ranges: 50-60 Hz
Delta grinder—Frequency ranges: 50-60 Hz
Dental water jet—Frequency ranges: 50-60 Hz
Disc grinder—Frequency ranges: 50-60 Hz
Dishwasher—Frequency ranges: 50-60 Hz
Disk saw—Frequency ranges: 50-60 Hz
Domestic hot water tank—Frequency ranges: 50-60 Hz
Drill—Frequency ranges: 50-60 Hz
Drill (portable)—Frequency ranges: 50-60 Hz
Drilling hammer—Frequency ranges: 50-60 Hz
Drilling machine—Frequency ranges: 50-60 Hz
EAS System—Frequency ranges: 10 Hz-20 kHz
Earphones—Frequency ranges: 0 Hz, 30 Hz-20 kHz
Eccentric grinder—Frequency ranges: 50-60 Hz
Electric blanket—Frequency ranges: 50-60 Hz
Electric car—Frequency ranges: 2 Hz-3 kHz
Electric carving knife—Frequency ranges: 50-60 Hz
Electric dry shaver—Frequency ranges: 0 Hz, 50-60 Hz
Electric grill—Frequency ranges: 50-60 Hz
Electric hauler—Frequency ranges: 2 Hz-3 kHz
Electric power transformer substation—Frequency ranges: 50-60 Hz
Electric screwdriver—Frequency ranges: 50-60 Hz
Electric steam sterilizer (for baby bottles)—Frequency ranges: 50-60 Hz
Electric toothbrush—Frequency ranges: 1 Hz-2 kHz, 50-60 Hz
Electric vehicles—Frequency ranges: 2 Hz-3 kHz
Electromagnetic EAS system—Frequency ranges: 10 Hz-20 kHz Electronic Article Surveillance—Frequency ranges: 10 Hz-20 kHz
Energy-saving bulb—Frequency ranges: 50-60 Hz
Energy-saving light—Frequency ranges: 50-60 Hz
Entertainment electronics—Frequency ranges: 0 Hz, 30 Hz-20 kHz
Epilator—Frequency ranges: 50-60 Hz
Extractor fan—Frequency ranges: 50-60 Hz
Extractor hood—Frequency ranges: 50-60 Hz
Fan heater—Frequency ranges: 50-60 Hz
File—Frequency ranges: 50-60 Hz
Fish-tank pump—Frequency ranges: 50-60 Hz
Flat iron—Frequency ranges: 50-60 Hz
Flat panel display—Frequency ranges: 50-60 Hz, 50 Hz-15.625 kHz
Flat screen—Frequency ranges: 50-60 Hz, 50 Hz-15.625 kHz
Floor heating—Frequency ranges: 50-60 Hz
Flow heater—Frequency ranges: 50-60 Hz
Fluorescent bulb—Frequency ranges: 50-60 Hz
Fluorescent lamp—Frequency ranges: 50-60 Hz
Fluorescent tube—Frequency ranges: 50-60 Hz
Food processor—Frequency ranges: 50-60 Hz
Freezer—Frequency ranges: 50-60 Hz
Fridge—Frequency ranges: 50-60 Hz
Full hybrid car—Frequency ranges: ≤100 kHz
Full hybrid vehicle—Frequency ranges: ≤100 kHz
Games console—Frequency ranges: 50-60 Hz
Garden tools—Frequency ranges: 50-60 Hz
Grill—Frequency ranges: 50-60 Hz
Grinder—Frequency ranges: 50-60 Hz
Grinding device—Frequency ranges: 50-60 Hz
High voltage direct current (HVDC) cable—Frequency ranges: 0 Hz
HVDC overhead cable—Frequency ranges: 0 Hz
Hair cutter—Frequency ranges: 50-60 Hz
Hair dryer—Frequency ranges: 50-60 Hz
Hair straighteners—Frequency ranges: 50-60 Hz
Hammer drill—Frequency ranges: 50-60 Hz
Hand-held blender—Frequency ranges: 50-60 Hz
Hand-held mixer—Frequency ranges: 50-60 Hz
Headphones—Frequency ranges: 0 Hz, 30 Hz-20 kHz
Headset—Frequency ranges: 0 Hz, 30 Hz-20 kHz
Heated floor—Frequency ranges: 50-60 Hz
Heating blanket—Frequency ranges: 50-60 Hz
Heating mat—Frequency ranges: 50-60 Hz
Heating systems—Frequency ranges: 50-60 Hz
Hedge shears—Frequency ranges: 50-60 Hz
Hedge trimmer—Frequency ranges: 50-60 Hz
Hi-fi system—Frequency ranges: 0 Hz, 30 Hz-20 kHz
High voltage power transmission lines—Frequency ranges: 50-60 Hz
High-voltage direct current cable—Frequency ranges: 0 Hz
High-voltage direct-current cable—Frequency ranges: 0 Hz
Hob—Frequency ranges: 50-60 Hz
Hoover—Frequency ranges: 50-60 Hz, 10-150 kHz
Hot-water apparatus—Frequency ranges: 50-60 Hz
Humidifier—Frequency ranges: 50-60 Hz
Humidity vacuum cleaner—Frequency ranges: 50-60 Hz
Hybrid bus—Frequency ranges: ≤100 kHz
Hybrid electrical vehicle—Frequency ranges: ≤100 kHz
Hybrid truck—Frequency ranges: ≤100 kHz
Hybrid vehicle—Frequency ranges: ≤100 kHz
Hygiene & care—Frequency ranges: 0 Hz, 1 Hz-500 kHz, 50-60 Hz Ice cream maker—Frequency ranges: 50-60 Hz
Ice cream machine—Frequency ranges: 50-60 Hz
Illumination—Frequency ranges: 50 Hz-60 kHz
Impact drill—Frequency ranges: 50-60 Hz
Induction hob—Frequency ranges: 20-100 kHz
Induction stove—Frequency ranges: 20-100 kHz
Inductive charging—Frequency ranges: 1 kHz-100 MHz
Iron—Frequency ranges: 50-60 Hz
Jig saw—Frequency ranges: 50-60 Hz
Juicer—Frequency ranges: 50-60 Hz
Kitchenware and household appliances—Frequency ranges: 50-60 Hz
Knife sharpener—Frequency ranges: 50-60 Hz
LED bulb—Frequency ranges: 50-60 Hz
Lamps—Frequency ranges: 50 Hz-60 kHz
Laptop—Frequency ranges: 50-60 Hz
Laptop power supply—Frequency ranges: 50-60 Hz
Laundry dryer—Frequency ranges: 50-60 Hz, 10-150 kHz
Lava-lamp—Frequency ranges: 50-60 Hz
Lawn mower—Frequency ranges: 50-60 Hz
Lawn-edge cutters—Frequency ranges: 50-60 Hz
Lawn-edge trimmer—Frequency ranges: 50-60 Hz
Lawnmower—Frequency ranges: 50-60 Hz
Lights—Frequency ranges: 50 Hz-60 kHz
MRI—Frequency ranges: 0-498.2 MHz
Maglev train, maglev—Frequency ranges: 0 Hz, 16-512 Hz, 47.5-62.5 Hz
Magnet resonance imaging—Frequency ranges: 0-498.2 MHz
Magnetic levitation train—Frequency ranges: 0 Hz, 16-512 Hz, 47.5-62.5 Hz
Manicure set—Frequency ranges: 50-60 Hz
Meat chopper—Frequency ranges: 50-60 Hz
Meat grinder—Frequency ranges: 50-60 Hz
Meat mincer—Frequency ranges: 50-60 Hz
Meat mincing machine—Frequency ranges: 50-60 Hz
Metal detector—Frequency ranges: 0.1-3.5 kHz, 940 Hz, 20 kHz
Metro—Frequency ranges: 0 Hz, ≤300 Hz
Mild hybrid car—Frequency ranges: ≤100 kHz
Mild hybrid vehicle—Frequency ranges: ≤100 kHz
Milling machine—Frequency ranges: 50-60 Hz
Mixing devices—Frequency ranges: 50-60 Hz
Mobile phone charger—Frequency ranges: 50-60 Hz
Monitor—Frequency ranges: 50-60 Hz, 50 Hz-15.625 kHz
Music centre—Frequency ranges: 0 Hz, 30 Hz-20 kHz
Storage heater—Frequency ranges: 50-60 Hz
Night power storage heater—Frequency ranges: 50-60 Hz
Nail care—Frequency ranges: 50-60 Hz
Night storage heater—Frequency ranges: 50-60 Hz
Oral irrigator—Frequency ranges: 50-60 Hz
Oscillating grinder—Frequency ranges: 50-60 Hz
Oven—Frequency ranges: 50-60 Hz
Oven and hob pack—Frequency ranges: 50-60 Hz
Overhead power transmission line—Frequency ranges: 50-60 Hz
Overhead rail track—Frequency ranges: 16.7 Hz
PC screen—Frequency ranges: 50-60 Hz, 50 Hz-15.625 kHz
Paint spray gun—Frequency ranges: 50-60 Hz
Parer—Frequency ranges: 50-60 Hz
PC—Frequency ranges: 50-60 Hz
Pencil sharpener—Frequency ranges: 50-60 Hz
Pendulum grinding machine—Frequency ranges: 50-60 Hz Pepper grinder—Frequency ranges: 50-60 Hz Pepper mill—Frequency ranges: 50-60 Hz Percussion drilling machine—Frequency ranges: 50-60 Hz Personal Computer and Laptops—Frequency ranges: 50-60 Hz Personal computer—Frequency ranges: 50-60 Hz Photovoltaic plant—Frequency ranges: 0 Hz-100 kHz Planing machine—Frequency ranges: 50-60 Hz Plasma display panel—Frequency ranges: 50-60 Hz, 50 Hz-15.625 kHz Polisher—Frequency ranges: 50-60 Hz Portable heater—Frequency ranges: 50-60 Hz Power lines—Frequency ranges: 50-60 Hz Power saw—Frequency ranges: 50-60 Hz Power transmission lines—Frequency ranges: 50-60 Hz Pressing iron—Frequency ranges: 50-60 Hz Printer, fax, copy machine—Frequency ranges: 50-60 Hz Radio set—Frequency ranges: 50-60 Hz Railway—Frequency ranges: 0 Hz, 16.7 Hz, 50-60 Hz, . . .

Razor—Frequency ranges: 0 Hz, 50-60 Hz

Refrigerator—Frequency ranges: 50-60 Hz

Salt grinder—Frequency ranges: 50-60 Hz

Salt mill—Frequency ranges: 50-60 Hz

Sander—Frequency ranges: 50-60 Hz

Sanding machine—Frequency ranges: 50-60 Hz

Sandwich grill—Frequency ranges: 50-60 Hz

Saw—Frequency ranges: 50-60 Hz

Screen—Frequency ranges: 50-60 Hz, 50 Hz-15.625 kHz

Screwdriver—Frequency ranges: 50-60 Hz

Sewing machine—Frequency ranges: 50-60 Hz

Side grinder—Frequency ranges: 50-60 Hz

Slicer—Frequency ranges: 50-60 Hz

Slow cooker—Frequency ranges: 50-60 Hz

Smart meter—Frequency ranges: 50-60 Hz

Smoothing iron—Frequency ranges: 50-60 Hz

Solarium—Frequency ranges: 50-60 Hz

Sound system—Frequency ranges: 0 Hz, 30 Hz-20 kHz

Speicherheizung—Frequency ranges: 50-60 Hz

Spray gun—Frequency ranges: 50-60 Hz

Standing drill—Frequency ranges: 50-60 Hz

Steam sterilizer (for baby bottles)—Frequency ranges: 50-60 Hz

Stereo—Frequency ranges: 0 Hz, 30 Hz-20 kHz

Stereo system—Frequency ranges: 0 Hz, 30 Hz-20 kHz

Sterilizer for baby bottles—Frequency ranges: 50-60 Hz

Storage water heater—Frequency ranges: 50-60 Hz

Streetcar—Frequency ranges: 0 Hz, 180-300 Hz

Substation—Frequency ranges: 50-60 Hz

Subway—Frequency ranges: 0 Hz, ≤300 Hz

Sunbed—Frequency ranges: 50-60 Hz

TETRA hand portable—Frequency ranges: 870-876 Hz

TETRA handset—Frequency ranges: 870-876 Hz

TV screen—Frequency ranges: 50-60 Hz, 50 Hz-15.625 kHz

Tanning bed—Frequency ranges: 50-60 Hz

Tin opener—Frequency ranges: 50-60 Hz

Toaster—Frequency ranges: 50-60 Hz

Tools—Frequency ranges: 50-60 Hz

Toothbrush—Frequency ranges: 1 Hz-2 kHz, 50-60 Hz

Topper—Frequency ranges: 50-60 Hz

Train—Frequency ranges: 0 Hz, 16.7 Hz, 50-60 Hz, . . .

Tram—Frequency ranges: 0 Hz, 180-300 Hz

Tramway—Frequency ranges: 0 Hz, 180-300 Hz

Transformer substation—Frequency ranges: 50-60 Hz

Trolley—Frequency ranges: 0 Hz, 180-300 Hz

Trouser press—Frequency ranges: 50-60 Hz

Truck (with combustion engine)—Frequency ranges: 50-60 Hz, ≤20 Hz

Tube screen—Frequency ranges: 50-60 Hz, 50 Hz-15.625 kHz

Tumble dryer—Frequency ranges: 50-60 Hz, 10-150 kHz

Tumbler—Frequency ranges: 50-60 Hz, 10-150 kHz

Underfloor heating—Frequency ranges: 50-60 Hz

Underground and sea cables—Frequency ranges: 0 Hz, 50-60 Hz

Up to 72.5 kV transmission lines—Frequency ranges: 50-60 Hz

Vacuum cleaner—Frequency ranges: 50-60 Hz, 10-150 kHz

Vehicle with combustion engine—Frequency ranges: 50-60 Hz, ≤20 Hz

Visual display terminal—Frequency ranges: 50-60 Hz, 50 Hz-15.625 kHz

Visual display unit—Frequency ranges: 50-60 Hz, 50 Hz-15.625 kHz

Warming mat—Frequency ranges: 50-60 Hz

Washing machine—Frequency ranges: 50-60 Hz, 10-150 kHz

Waterbed—Frequency ranges: 50-60 Hz

Water boiler—Frequency ranges: 50-60 Hz

Water cooker—Frequency ranges: 50-60 Hz

Water heater—Frequency ranges: 50-60 Hz

Weather radar—Frequency ranges: 9.4 Hz-9.5 GHz

Wind energy plant—Frequency ranges: 50-60 Hz

Windmill—Frequency ranges: 50-60 Hz

Wind power plant—Frequency ranges: 50-60 Hz

Wind turbine—Frequency ranges: 50-60 Hz

Wireless charging—Frequency ranges: 1 kHz-100 MHz

Wireless power—Frequency ranges: 1 kHz-100 MHz

Wireless power transfer—Frequency ranges: 1 kHz-100 MHz iPod—Frequency ranges: 0 Hz, 50-60 Hz, 30-300 kHz Discussion of a telecoil may also apply with respect to other types of induced-current devices, such as Bluetooth radios, 900 MHz radios, near-field magnetic induction (NFMI) receiving coils, magnetometers, and other devices (i.e., magnetic sensors) that generate induced electrical signals. The techniques may also apply to situations in which one or more induced-current devices are included in personal devices of user 104, such as a telephone of user 104.

The following is a non-limiting list of aspects in accordance with one or more techniques of this disclosure.

Aspect 1. A method comprising: obtaining, by a processing system that includes one or more processors implemented in circuitry, a signal from a magnetic sensor of a hearing instrument; determining, by the processing system, a context of the hearing instrument based at least in part on the signal from the magnetic sensor; and initiating, by the processing system, one or more actions based on the context of the hearing instrument.

Aspect 2. The method of aspect 1, wherein determining the context of the hearing instrument comprises determining, by the processing system, based at least in part on the signal from the magnetic sensor, a type of electronic device used in a vicinity of the hearing instrument.

Aspect 3. The method of aspects 1-2, wherein initiating the one or more actions includes adjusting noise reduction settings of the hearing instrument.

Aspect 4. The method of any of aspects 1-3, wherein initiating the one or more actions includes adjusting speech enhancement settings of the hearing instrument.

Aspect 5. A method comprising: obtaining, by a processing system that includes one or more processors implemented in circuitry, a signal from a magnetic sensor of a hearing instrument; determining, by the processing system, an activity of a user of the hearing instrument based at least in part on the signal from the magnetic sensor; and initiating, by the processing system, one or more actions based on the activity of the user of the hearing instrument.

Aspect 6. The method of aspect 5, wherein determining the activity of the user comprises applying a machine learning model that determines the activity of the user based at least in part on data representing the signal from the magnetic sensor.

Aspect 7. The method of aspect 6, wherein determining the activity of the user comprises: determining, by the processing system, based at least in part on the data representing the signal from the magnetic sensor, a type of electronic device used in a vicinity of the hearing instrument; and determining, by the processing system, the activity of the user based on the type of electronic device.

Aspect 8. The method of any of aspects 5-7, wherein initiating the one or more actions based on the activity of the user of the hearing instrument comprises updating, by the processing system, a to-do list for the user to indicate completion of the activity.

Aspect 9. The method of any of aspects 5-8, wherein the method further comprises: detecting, by the processing system, based on the signal from the magnetic sensor, that the user is in a vicinity of an electrical loop embedded in a walking area; and based on the user being in the vicinity of the electrical loop embedded in the walking area and the activity of the user being walking, initiating, by the processing system, one or more actions to guide the user along the walking area.

Aspect 10. A method comprising: obtaining magnetic sensor signals and corresponding microphone signals; using the magnetic sensor signals and corresponding microphone signals to train a machine learning model to generate modified microphone signals that resemble the magnetic sensor signals; obtaining a new microphone signal; applying the machine learning model to the new microphone signal to generate a new modified microphone signal; and outputting sound based on the new modified microphone signal.

Aspect 11. A system comprising: one or more storage devices configured to store a signal from a magnetic sensor of a hearing instrument; and a processing system comprising one or more processors configured to: determine a context of the hearing instrument based at least in part on the signal from the magnetic sensor; and initiate one or more actions based on the context of the hearing instrument.

Aspect 12. The system of aspect 11, wherein the processing system is configured to determine the context of the hearing instrument comprises determining, by the processing system, based at least in part on the signal from the magnetic sensor, a type of electronic device used in a vicinity of the hearing instrument.

Aspect 13. The system of any of aspects 11-12, wherein the one or more actions include adjusting noise reduction settings of the hearing instrument.

Aspect 14. The system of any of aspects 11-13, wherein the one or more actions include adjusting speech enhancement settings of the hearing instrument.

Aspect 15. A system comprising: one or more storage devices configured to store a signal from a magnetic sensor of a hearing instrument; and a processing system comprising one or more processors configured to: determine an activity of a user of the hearing instrument based at least in part on the signal from the magnetic sensor; and initiate one or more actions based on the activity of the hearing instrument.

Aspect 16. The system of aspect 15, wherein the processing system is configured to, as part of determining the activity of the user, apply a machine learning model that determines the activity of the user based at least in part on data representing the signal from the magnetic sensor.

Aspect 17. The system of aspect 16, wherein the processing system is configured to, as part of determining the activity of the user: determine, based at least in part on the data representing the signal from the magnetic sensor, a type of electronic device used in a vicinity of the hearing instrument; and determine the activity of the user based on the type of electronic device.

Aspect 18. The system of any of aspects 15-17, wherein the processing system is configured to, as part of initiating the one or more actions based on the activity of the user of the hearing instrument, update a to-do list for the user to indicate completion of the activity.

Aspect 19. The system of any of aspects 15-18, wherein the processing system is further configured to: detect, based on the signal from the magnetic sensor, that the user is in a vicinity of an electrical loop embedded in a walking area; and based on the user being in the vicinity of the electrical loop embedded in the walking area and the activity of the user being walking, initiate one or more actions to guide the user along the walking area.

Aspect 20. A system comprising: one or more storage devices configured to store magnetic sensor signals and corresponding microphone signals; and a processing system comprising one or more processors configured to: use the magnetic sensor signals and corresponding microphone signals to train a machine learning model to generate modified microphone signals that resemble the magnetic sensor signals; obtain a new microphone signal; apply the machine learning model to the new microphone signal to generate a new modified microphone signal; and output sound based on the new modified microphone signal.

Aspect 21. A non-transitory computer-readable storage medium having instructions stored thereon that, when executed cause one or more processors to perform the methods of any of aspects 1-10.

In this disclosure, ordinal terms such as "first," "second," "third," and so on, are not necessarily indicators of positions within an order, but rather may be used to distinguish different instances of the same thing. Examples provided in this disclosure may be used together, separately, or in various combinations. Furthermore, with respect to examples that involve personal data regarding a user, it may be required that such personal data only be used with the permission of the user. Furthermore, it is to be understood that discussion in this disclosure of hearing instrument 102A (including components thereof, such as an in-ear assembly, speaker 108A, microphone 110A, processors 112A, telecoil 120A, etc.) may apply with respect to hearing instrument 102B.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processing circuits to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, cache memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair cable, digital subscriber line (DSL), or wireless technologies such as infrared, radio, and microwave, then the coaxial cable, fiber optic cable, twisted pair cable, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. The terms disk and disc, as used herein, may include compact discs (CDs), optical discs, digital versatile discs (DVDs), floppy disks, Blu-ray discs, hard disks, and other types of spinning data storage media. Combinations of the above should also be included within the scope of computer-readable media.

Functionality described in this disclosure may be performed by fixed function and/or programmable processing circuitry. For instance, instructions may be executed by fixed function and/or programmable processing circuitry. Such processing circuitry may include one or more processors, such as one or more digital signal processors (DSPs), general purpose microprocessors, application specific integrated circuits (ASICs), AI accelerators, field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements. Processing circuits may be coupled to other components in various ways. For example, a processing circuit may be coupled to other components via an internal device interconnect, a wired or wireless network connection, or another communication medium.

The techniques of this disclosure may be implemented in a wide variety of devices or apparatuses, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

What is claimed is:

1. A method comprising:

obtaining, by a processing system that includes one or more processors implemented in circuitry, a signal from a magnetic sensor of a hearing instrument;

determining, by the processing system, a context of the hearing instrument based at least in part on the signal from the magnetic sensor;

initiating, by the processing system, one or more first actions based on the context of the hearing instrument;

determining, by the processing system, an activity of a user of the hearing instrument based at least in part on the signal from the magnetic sensor; and initiating, by the processing system, one or more second actions based on the activity of the user of the hearing instrument.

2. The method of claim 1, wherein determining the context of the hearing instrument comprises determining, by the processing system, based at least in part on the signal from the magnetic sensor, a type of electronic device used in a vicinity of the hearing instrument.

3. The method of claim 1, wherein initiating the one or more first actions includes adjusting noise reduction settings of the hearing instrument.

4. The method of claim 1, wherein initiating the one or more first actions includes adjusting speech enhancement settings of the hearing instrument.

5. The method of claim 1, wherein determining the activity of the user comprises applying a machine learning model that determines the activity of the user based at least in part on data representing the signal from the magnetic sensor.

6. The method of claim 5, wherein determining the activity of the user comprises:

determining, by the processing system, based at least in part on the data representing the signal from the magnetic sensor, a type of electronic device used in a vicinity of the hearing instrument; and determining, by the processing system, the activity of the user based on the type of electronic device.

7. The method of claim 1, wherein initiating the one or more second actions based on the activity of the user of the hearing instrument comprises updating, by the processing system, a to-do list for the user to indicate completion of the activity.

8. The method of claim 1, wherein:

the method further comprises detecting, by the processing system, based on the signal from the magnetic sensor, that the user is in a vicinity of an electrical loop embedded in a walking area; and initiating the one or more second actions comprises: based on the user being in the vicinity of the electrical loop embedded in the walking area and the activity of the user being walking, initiating, by the processing system, the one or more second actions, wherein the one or more second actions guide the user along the walking area.

9. The method of claim 1, further comprising:

obtaining magnetic sensor signals and corresponding microphone signals;

using the magnetic sensor signals and the corresponding microphone signals to train a machine learning model to generate modified microphone signals that resemble the magnetic sensor signals;

obtaining a new microphone signal;

applying the machine learning model to the new microphone signal to generate a new modified microphone signal; and outputting sound based on the new modified microphone signal.

10. A system comprising:

one or more storage devices configured to store a signal from a magnetic sensor of a hearing instrument; and a processing system comprising one or more processors configured to:

determine a context of the hearing instrument based at least in part on the signal from the magnetic sensor; and initiate one or more first actions based on the context of the hearing instrument;

determine an activity of a user of the hearing instrument based at least in part on the signal from the magnetic sensor; and initiate one or more second actions based on the activity of the hearing instrument.

11. The system of claim 10, wherein the processing system is configured to determine the context of the hearing instrument comprises determining, by the processing system, based at least in part on the signal from the magnetic sensor, a type of electronic device used in a vicinity of the hearing instrument.

12. The system of claim 10, wherein the one or more first actions include adjusting noise reduction settings of the hearing instrument.

13. The system of claim 10, wherein the one or more first actions include adjusting speech enhancement settings of the hearing instrument.

14. The system of claim 10, wherein the processing system is configured to, as part of determining the activity of the user, apply a machine learning model that determines the activity of the user based at least in part on data representing the signal from the magnetic sensor.

15. The system of claim 14, wherein the processing system is configured to, as part of determining the activity of the user:

determine, based at least in part on the data representing the signal from the magnetic sensor, a type of electronic device used in a vicinity of the hearing instrument; and determine the activity of the user based on the type of electronic device.

16. The system of claim 10, wherein the processing system is configured to, as part of initiating the one or more second actions based on the activity of the user of the hearing instrument, update a to-do list for the user to indicate completion of the activity.

17. The system of claim 10, wherein the processing system is further configured to:

detect, based on the signal from the magnetic sensor, that the user is in a vicinity of an electrical loop embedded in a walking area; and based on the user being in the vicinity of the electrical loop embedded in the walking area and the activity of the user being walking, initiate the one or more second actions, wherein the one or more second actions guide the user along the walking area.

18. The system of claim 10, wherein:

the one or more storage devices are further configured to store magnetic sensor signals and corresponding microphone signals; and the processing system is further configured to:

use the magnetic sensor signals and the corresponding microphone signals to train a machine learning model to generate modified microphone signals that resemble the magnetic sensor signals;

obtain a new microphone signal;

apply the machine learning model to the new microphone signal to generate a new modified microphone signal; and output sound based on the new modified microphone signal.

19. The method of claim 1, wherein the context of the hearing instrument is one of a plurality of contexts, each of which corresponds to a different unique combination of potential values of a plurality of context parameters.

20. A method comprising:

obtaining, by a processing system that includes one or more processors implemented in circuitry, a signal from a magnetic sensor of a hearing instrument;

determining, by the processing system, a context of the hearing instrument based at least in part on the signal from the magnetic sensor, wherein determining the context of the hearing instrument comprises determining, by the processing system, based at least in part on the signal from the magnetic sensor, a type of electronic device used in a vicinity of the hearing instrument; and initiating, by the processing system, one or more actions based on the context of the hearing instrument.

21. The method of claim 20, wherein initiating the one or more actions includes one or more of:

adjusting noise reduction settings of the hearing instrument, or adjusting speech enhancement settings of the hearing instrument.

22. The method of claim 20, wherein the context of the hearing instrument is one of a plurality of contexts, each of which corresponds to a different unique combination of potential values of a plurality of context parameters.

23. A system comprising:

one or more storage devices configured to store a signal from a magnetic sensor of a hearing instrument; and a processing system comprising one or more processors configured to:

determine a context of the hearing instrument based at least in part on the signal from the magnetic sensor, where as part of determining the context of the hearing instrument, the processing system is configured to determine, based at least in part on the signal from the magnetic sensor, a type of electronic device used in a vicinity of the hearing instrument; and initiate one or more actions based on the context of the hearing instrument.

24. The system of claim 23, wherein the one or more actions include one or more of:

adjusting noise reduction settings of the hearing instrument, or adjusting speech enhancement settings of the hearing instrument.

* * * * *